(12) United States Patent
Kelada

(10) Patent No.: US 11,312,643 B2
(45) Date of Patent: Apr. 26, 2022

(54) ECOLOGICALLY SUSTAINABLE HYDRAULIC FRACTURING SYSTEM AND METHOD

(71) Applicant: Maher Isaac Kelada, Houston, TX (US)

(72) Inventor: Maher Isaac Kelada, Houston, TX (US)

( * ) Notice: Subject to any disclaimer, the term of this patent is extended or adjusted under 35 U.S.C. 154(b) by 168 days.

(21) Appl. No.: 16/534,138

(22) Filed: Aug. 7, 2019

(65) Prior Publication Data

US 2019/0367385 A1 Dec. 5, 2019

Related U.S. Application Data

(63) Continuation-in-part of application No. 15/760,342, filed as application No. PCT/US2016/052486 on Sep. 19, 2016, now Pat. No. 10,703,650, which is a continuation of application No. 14/967,295, filed on Dec. 12, 2015, now abandoned, application No.
(Continued)

(51) Int. Cl.
| | |
|---|---|
| *C02F 1/44* | (2006.01) |
| *B01D 61/08* | (2006.01) |
| *B01D 63/08* | (2006.01) |
| *B01D 65/02* | (2006.01) |
| *B01D 61/58* | (2006.01) |
| *C02F 1/463* | (2006.01) |

(Continued)

(52) U.S. Cl.
CPC ............. *C02F 1/441* (2013.01); *B01D 61/08* (2013.01); *B01D 61/58* (2013.01); *B01D 63/082* (2013.01); *B01D 65/02* (2013.01); *C02F 1/463* (2013.01); *B01D 61/025* (2013.01); *B01D 61/027* (2013.01); *B01D 2311/04* (2013.01); *B01D 2313/21* (2013.01); *B01D 2313/23* (2013.01); *B01D 2321/04* (2013.01); *C02F 2103/08* (2013.01); *C02F 2209/03* (2013.01); *Y02A 20/131* (2018.01); *Y02W 10/37* (2015.05)

(58) Field of Classification Search
None
See application file for complete search history.

(56) References Cited

U.S. PATENT DOCUMENTS

| | | |
|---|---|---|
| 4,434,057 A | 2/1984 | Marquardt |
| 7,048,855 B2 | 5/2006 | de la Cruz |

(Continued)

*Primary Examiner* — David C Mellon
(74) *Attorney, Agent, or Firm* — David Guerra

(57) ABSTRACT

An induced symbiotic osmosis system and method for treating produced fluids from a hydraulic fracturing process or system for symbiotic fluids fractionation, salinity power generation, brines and salts solution reverse osmosis. The system includes a reverse osmosis membrane assembly to create potable water from produced water. The membrane assembly includes a hollow fiber or flat sheet membrane and headers to transfer desalinated water therefrom. The system can include an electro coagulation system, an ultra or nano filtration system, and a desalter to treat the produced water or brine. A heat exchanger can be positioned between adjacent reverse osmosis membrane assemblies. An osmotic power generation unit can create electrical power by receiving and utilizing produce water and brine water from a brine storage. The system reduces the release of global warming contributing gases associated with hydraulic fracturing, while producing potable water and power.

18 Claims, 31 Drawing Sheets

Related U.S. Application Data

16/534,138, which is a continuation of application No. 15/757,604, filed as application No. PCT/US2016/052489 on Sep. 19, 2016, now Pat. No. 10,981,115, which is a continuation of application No. 15/257,585, filed on Sep. 6, 2016, now abandoned, application No. 16/534,138, which is a continuation-in-part of application No. PCT/US2018/054740, filed on Oct. 5, 2018.

(60) Provisional application No. 62/220,885, filed on Sep. 18, 2015, provisional application No. 62/220,874, filed on Sep. 18, 2015.

(51) Int. Cl.
*B01D 61/02* (2006.01)
*C02F 103/08* (2006.01)

(56) References Cited

U.S. PATENT DOCUMENTS

| | | |
|---|---|---|
| 8,668,828 B2 | 3/2014 | Knappe et al. |
| 8,685,252 B2 | 4/2014 | Vuong et al. |
| 2006/0144787 A1 | 7/2006 | Schmidt et al. |
| 2007/0080113 A1 | 4/2007 | Vuong |
| 2008/0264845 A1 | 10/2008 | Max |
| 2009/0107915 A1* | 4/2009 | Skinner ............... C02F 9/00 210/636 |
| 2010/0237016 A1 | 9/2010 | Vuong |
| 2011/0044824 A1 | 2/2011 | Kelada |
| 2011/0198285 A1* | 8/2011 | Wallace ............ C01B 35/1045 210/638 |
| 2012/0267306 A1 | 10/2012 | McGinnis et al. |
| 2014/0231333 A1 | 8/2014 | Kelada |
| 2017/0081216 A1* | 3/2017 | Kelada ................ B01D 65/02 |

* cited by examiner

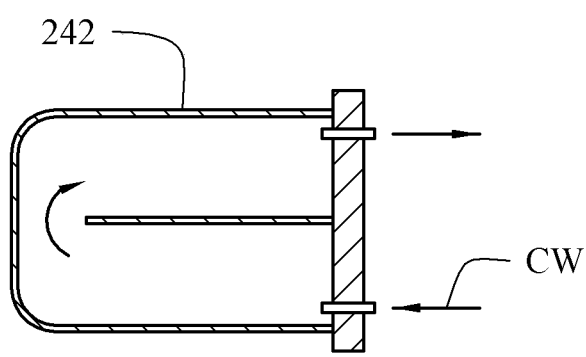 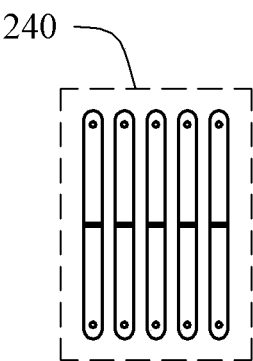
FIG. 31　　　　　　FIG. 32
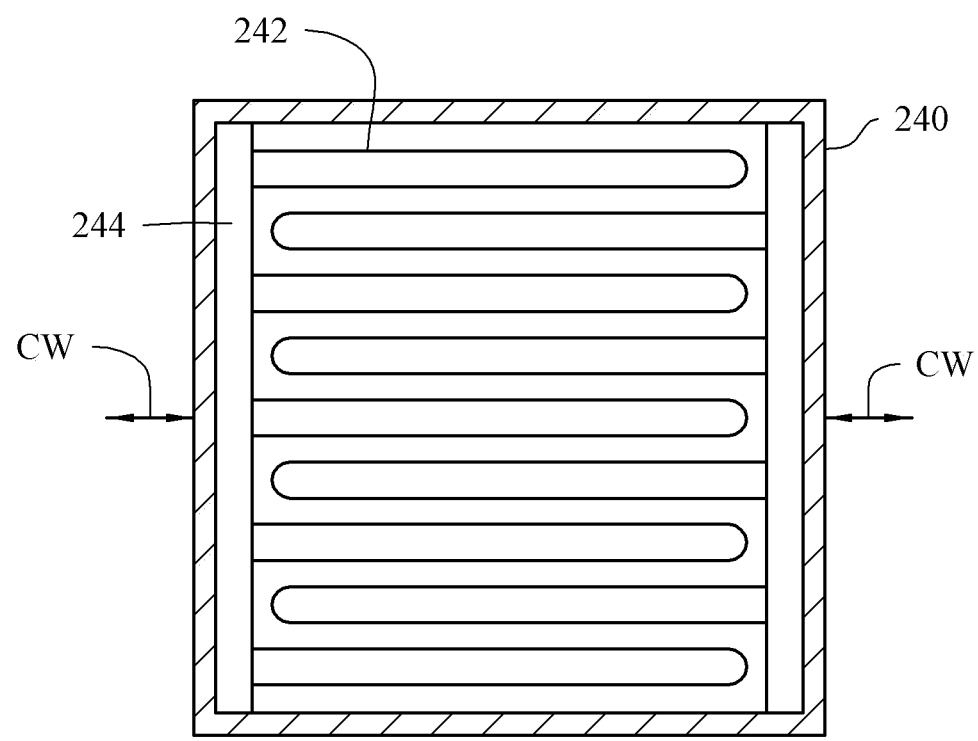
FIG. 33

ECOLOGICALLY SUSTAINABLE HYDRAULIC FRACTURING SYSTEM AND METHOD

CROSS-REFERENCE TO RELATED APPLICATION

This application is a continuation-in-part under 35 U.S.C. § 120 based upon co-pending U.S. patent application Ser. No. 15/760,342 filed on Mar. 15, 2018, U.S. patent application Ser. No. 15/757,604 filed on Mar. 5, 2018, and international application Serial No. PCT/US2018/054740 filed on Oct. 5, 2018, which are incorporated herein by reference in its entirety.

BACKGROUND

Technical Field

The present technology relates to an ecologically sustainable hydraulic fracturing system and method for use in connection with processing and/or desalinating produced water from a subterranean hydraulic fracking operation.

Background Description

Hydraulic fracturing water is a complex fluid of multitude of soluble and insoluble components of chemical and organic matter that may comprise different microorganisms. Recovering salt-free water or any specific mineral component of this chemical broth requires multiple unit operations.

Flowback and produced water comprise several waste categories including Volatile Organics, Semi-volatile Organics, Pesticides, Organophosphorus PCBs, Metals and Radiological components.

Volatile Organics comprising 71 species, including benzene, toluene, xylenes, ethylbenzene. Most of the volatiles are manmade chemicals for domestic and industrial use; gasoline, solvents, cleaners and degreasers, paints, inks and dyes, and pesticides, all of which are not found in conventional produced waters.

Semi-volatile compounds comprising 113 Species, including naphthalene, Diethyl phthalate, 2-methyl naphthalene, phenanthrene, Acenaphthylene, Pyrene, phenol. Many of the semi-volatiles on the list were manmade chemicals not found in conventional produced waters. Many of the semi-volatiles are derived from or constituents of coal or coal tar.

Pesticides compounds are Chlordane, Alpha-BHC, Beta-BHC, Delta-BHC, Gamma-BHC, Heptachlor, Aldrin, Heptachlor epoxide, Endosulfan I, Dieldrin, 4,4'-DDE, Endrin, Endrin ketone, Endrin aldehyde, Endosulfan II, 4,4'-DDT, Endosulfan sulfate, Toxaphene.

Metal compounds: Mercury, arsenic, boron, trivalent chromium, hexavalent chromium, copper, nickel, zinc, lead, selenium, cobalt, iron, manganese, lithium and tin.

Radionuclides: These Radiological components are present in soil and rock, they can also be found in groundwater and surface water. Typical radionuclides found in drinking water sources are isotopes of radium, uranium, and radon, among others. Presence of radionuclides in shale formation water is well documented. Analytical method of choice is EPA Method 901.1 modified (Gamma Spectroscopy).

Radium-226 and Radium-228 represent more than 80% of the potential radiation dose in ingested water.

Mechanical Vapor Recompression thermal distillation (MVR) process seems capable of evaporating brines up to 120,000 mg/l TDS or more, with efficiencies exceeding 70%.

However, reverse osmosis (RO) on shale gas waters is relatively efficient means for water recovery, if influent water does not exceed 4% salinity i.e., a typical seawater RO desalination process.

Escalating demand for primary energy in power generation, transportation, and household activities has led to increased consumption of oil & gas in major economies across the globe. However, Major oil & gas producers around the world have been experiencing a decline in production levels owing to depleting conventional reserves.

Hydrocarbon extraction from the unconventional reserves has increased using horizontal drilling in combination with hydraulic fracturing techniques. Most of the future fracking demand is expected to come from emerging economies including China, Argentina, Brazil, Mexico, Algeria, and Russia owing to increasing horizontal drilling projects in unconventional hydrocarbon fields.

For many years, polymeric membranes have been widely utilized in practical applications without having precise information on their pore size and pore size distribution, despite the fact that most commercial membranes are prepared by the phase inversion technique, and the performance of those membranes is known to be governed by their pore characteristics in a complicated manner.

These pore characteristics are influenced both by the molecular characteristics of the polymer and by its preparation method. For pressure-driven membrane, separation processes are based on membrane pore diameter. For example, reverse osmosis (RO, <1 nm), dialysis (2-5 nm), ultrafiltration (UF, 2-100 nm), and microfiltration (MF, 100 nm to 2 μm). Nanofiltration (NF) membranes pore sizes is between the bore sizes of RO and UF membranes.

Membrane characteristics are highly dependent on its intended service. For example, seawater reverse osmosis desalination (recovering H2O form seawater) membrane requires stringent requirements for pore size and for operating pressure than those for macro and micro seawater filtration (removing contaminates from seawater) membranes. Reverse osmosis (RO) membranes are well suited to desalination of moderate brines (up to 35,000-45,000 mg/L) in the absence of oil and other organics Recently, atomic force microscopy (AFM) is a three-dimensional topographic technique is being for measuring pore size and pore size distribution, surface pore density. Dimensions Reference: 1 nm (nano meter)=1000 pm (1000 pico meter), 1 μm (micro meter)=1000 nm (1000 nanometer), 1 nanometer=10 Angstrom. It is known that global warming is contributed by massive emissions by other hydrocarbon gases, particularly from water insoluble methane (natural gas CH4), which is a serious and primary culprit in this environmental calamity of life and continues nowadays to be generated naturally by anaerobic reaction of organic matter; digestion of food, particularly by food regurgitating animals It can be appreciated that global warming is a result of massive emissions, not from carbon dioxide as everyone claims, but essentially from other hydrocarbon gases, particularly from water insoluble methane (natural gas CH4), which is a serious and primary culprit in this environmental calamity of life and continues nowadays to be generated naturally by anaerobic reaction of organic matter; digestion of food, particularly by food regurgitating animals.

Therefore, a need exists for a new and novel ecologically sustainable hydraulic fracturing that can be used for processing and/or desalinating produced water from a subterranean hydraulic fracking operation. In this regard, the present technology substantially fulfills this need. In this respect, the ecologically sustainable hydraulic fracturing according to the present technology substantially departs from the conventional concepts and designs of the prior art, and in doing so provides an apparatus primarily developed for the purpose of processing and/or desalinating produced water from a subterranean hydraulic fracking operation.

BRIEF SUMMARY OF THE PRESENT TECHNOLOGY

In view of the foregoing disadvantages inherent in the known types of systems and processes for treating produced water from hydraulic fracturing, the present technology provides a novel ecologically sustainable hydraulic fracturing, and overcomes the above-mentioned disadvantages and drawbacks of the prior art. As such, the general purpose of the present technology, which will be described subsequently in greater detail, is to provide a new and novel ecologically sustainable hydraulic fracturing and method which has all the advantages of the prior art mentioned heretofore and many novel features that result in an ecologically sustainable hydraulic fracturing which is not anticipated, rendered obvious, suggested, or even implied by the prior art, either alone or in any combination thereof.

According to one aspect of the present technology, the present technology essentially includes a water treatment system for treating produced fluids from a hydraulic fracturing process or system. The system can include an induced symbiotic osmosis system having at least one reverse osmosis membrane assembly configured to receive produced water from a hydraulic fracturing process. The membrane assembly can include at least one hollow fiber or flat sheet membrane and at least one header configured to receive desalinated water from the hollow fiber or flat sheet membrane. A frame having an open end configured to receive the membrane assembly. A shell can be configured to receive and enclose the frame and the membrane assembly so that an annulus is created between the shell and the frame allowing the produced water to flow into the open end of the frame and through the hollow fiber or flat sheet membrane. The shell can include a waste collecting section configured to receive an effluent from the hollow fiber or flat sheet membrane.

According to another aspect, the present technology essentially includes a water treatment system for treating produced fluids from a hydraulic fracturing process or system. The system can include an electro coagulation system configured to receive produced water. An ultra or nano filtration system can be configured to receive the produced water from the electro coagulation system. An induced symbiotic osmosis system can be configured to receive the produced water from the ultra or nano filtration system. The induced symbiotic osmosis system can include multiple reverse osmosis membrane assemblies sequentially configured to receive produced water from a hydraulic fracturing process. The membrane assemblies can include at least one hollow fiber or flat sheet membrane and at least one header configured to receive desalinated water from the hollow fiber or flat sheet membrane. A heat exchanger can be positioned between adjacent reverse osmosis membrane assemblies and configured to allow produced water to flow between the reverse osmosis membrane assemblies. The heat exchanger can include a plurality of tubes extending into the flow of the produced water. The tubes can be configured to receive a cooling fluid. A frame can have an open end configured to receive the membrane assemblies and the heat exchanger. A shell can be configured to receive and enclose the frame, the membrane assemblies and the heat exchanger so that an annulus is created between the shell and the frame allowing the produced water to flow into the open end of the frame and through the hollow fiber or flat sheet membrane. The shell can include a waste collecting section configured to receive an effluent from the hollow fiber or flat sheet membrane. A desalter can be configured to receive brine produced from the induced symbiotic osmosis system.

Still another aspect of the present technology is a method of treating produced fluids from a hydraulic fracturing process or system. The method can include the steps of receiving produced water from a hydraulic fracturing process. Desalinating the produced water utilizing a reverse osmosis system comprising a tower enclosing at least one hollow fiber or flat sheet membrane including at least one header configured to receive desalinated water from the hollow fiber or flat sheet membrane, and a frame having an open end configured to receive the membrane assembly. An annulus can be created between the tower and the frame allowing the produced water to flow into the open end of the frame and through the hollow fiber or flat sheet membrane. Discharging brine effluent from the tower.

There has thus been outlined, rather broadly, features of the present technology in order that the detailed description thereof that follows may be better understood and in order that the present contribution to the art may be better appreciated.

In some embodiments, the membrane assembly can include multiple interconnected hollow fiber or flat sheet membranes to create stages in the shell, with the header of each stage being in communication with each other.

In some embodiments, the shell is a tower with the multiple stages being stacked in a vertical relationship.

In some embodiments, the reverse osmosis membrane assembly can be multiple sequential reverse osmosis membrane assemblies.

Some embodiments can further include a heat exchanger positioned between adjacent reverse osmosis membrane assemblies and configured to allow produced water to flow between the reverse osmosis membrane assemblies. The heat exchanger can include a plurality of tubes extending into the flow of the produced water, the tubes being configured to receive a cooling fluid.

In some embodiments, the induced symbiotic osmosis system can be a train including multiple sequentially connected shells, with each of the shells including the membrane assembly, and the frame.

In some embodiments, the desalinated water of a first of the shells in the train can be transferred in sequence to each succeeding the shell until exiting a last of the shells in the train, with the effluent of the last of the shells can be transferred in sequence to each preceding the shell until exiting the first of the shells.

Some embodiments can include a pump associated with the transfer of the desalinated water, and a pressure exchanger associated with the transfer of the effluent, each of the pressure exchanger is in operable association with the pump of the same the shell.

Some embodiments can include a flocculation system and a sedimentation system configured to receive the produced water prior to entering the induced symbiotic osmosis system.

Even still, some embodiments can include a combustion system configured to receive gas or liquid associated with waste from the flocculation system or the sedimentation system to convert methane gas from the flocculation system to carbon dioxide that is provided to the sedimentation system.

Still further, some embodiments can include an electro coagulation system configured to receive the produced water prior to entering the induced symbiotic osmosis system.

Even still further, some embodiments can include an ultra or nano filtration system configured to receive the produced water from the electro coagulation system and prior to entering the induced symbiotic osmosis system.

Some embodiments can include a pH system configured to receive a portion of the produced water prior from the electro coagulation system, adjust the pH of the portion of the produced water, and return the portion of the produced water back to the system or the ultra or nano filtration system.

Yet further, some embodiments can include a minerals recovery system configured to receive the produced water from the ultra or nano filtration system prior to entering the induced symbiotic osmosis system. The minerals recovery system can be configured to extract minerals from the produced water.

Still further, some embodiments can include a temperature control system configured to receive a portion of the produced water prior to entering the induced symbiotic osmosis system, heat or cool the produced water, and return the portion of the produced water back to the system.

Even further, some embodiments can include a desalter configured to receive brine produced from the induced symbiotic osmosis system.

Some embodiments can include a nano filter configured to receive produced water from the ultra or nano filtration system prior to entering the minerals recovery system. The nano filter can be configured to filter out radium containment.

Numerous objects, features and advantages of the present technology will be readily apparent to those of ordinary skill in the art upon a reading of the following detailed description of the present technology, but nonetheless illustrative, embodiments of the present technology when taken in conjunction with the accompanying drawings.

As such, those skilled in the art will appreciate that the conception, upon which this disclosure is based, may readily be utilized as a basis for the designing of other structures, methods and systems for carrying out the several purposes of the present technology. It is, therefore, that the claims be regarded as including such equivalent constructions insofar as they do not depart from the spirit and scope of the present technology.

It is therefore an object of the present technology to provide a new and novel ecologically sustainable hydraulic fracturing that has all of the advantages of known systems and processes for treating produced water from hydraulic fracturing and none of the disadvantages.

Still another object of the present technology is to provide a new ecologically sustainable hydraulic fracturing that provides in the apparatuses and methods of the prior art some of the advantages thereof, while simultaneously overcoming some of the disadvantages normally associated therewith.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology.

BRIEF DESCRIPTION OF THE DRAWINGS

The present technology will be better understood and objects other than those set forth above will become apparent when consideration is given to the following detailed description thereof. Such description makes reference to the annexed drawings wherein:

FIG. 3 30 is a perspective view of a RO ultra or nano flat sheet membrane (FSM) mounted on a brine water cooler for adjusting membrane pore size with an exploded cooling water tube panel for sequential cooling exchangers between two vertically mounted FSM train.

FIG. 31 is a cross-section view of a cooling fluid (water or refrigerant) channeled water or gas plate heat exchanger of the present technology.

FIG. 32 is a side view of the plate heat exchanger of FIG. 31.

FIG. 33 is a top cross-sectional view of the water or gas plate heat exchanger of FIG. 31.

The same reference numerals refer to the same parts throughout the various figures.

DETAILED DESCRIPTION OF THE PRESENT TECHNOLOGY

Figure 1:
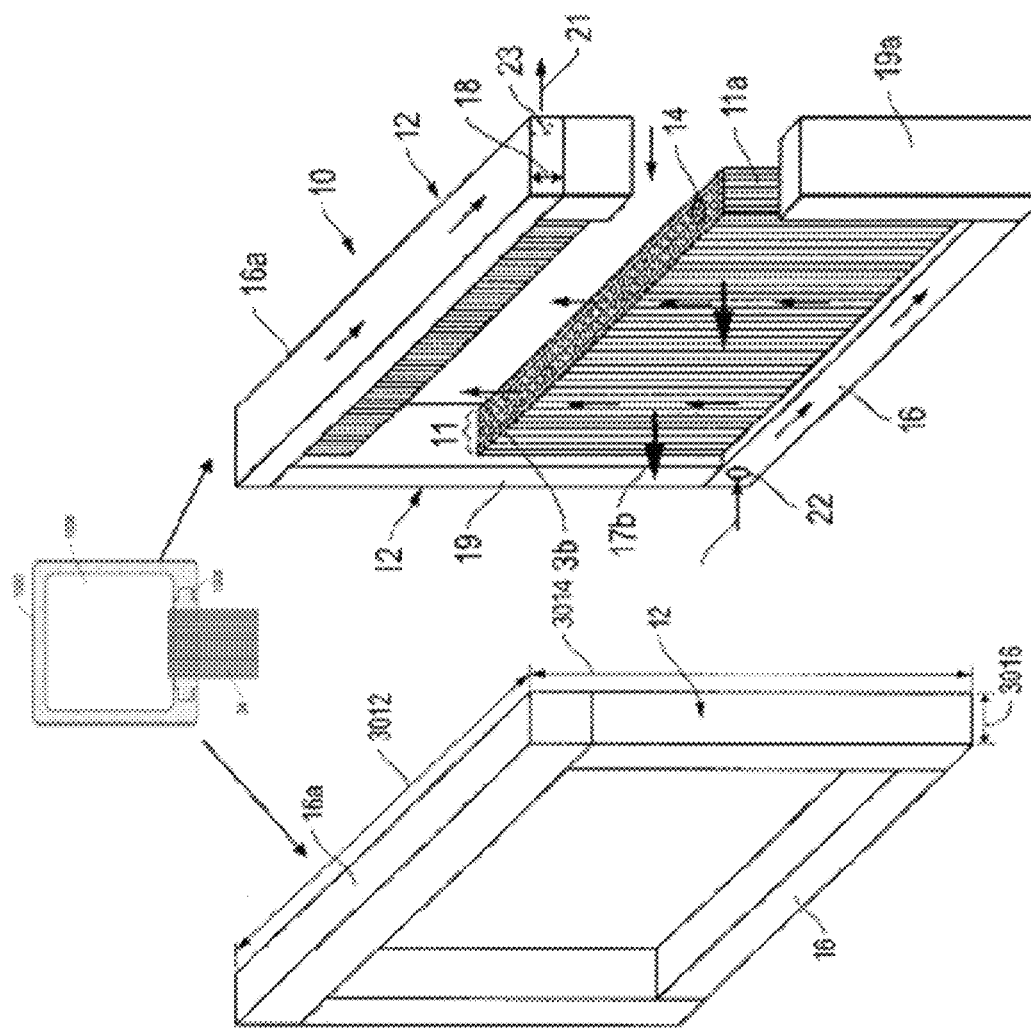
FIG. 1 is perspective views of prior art high capacity hollow fiver (HFM) frame design.
Figure 1:
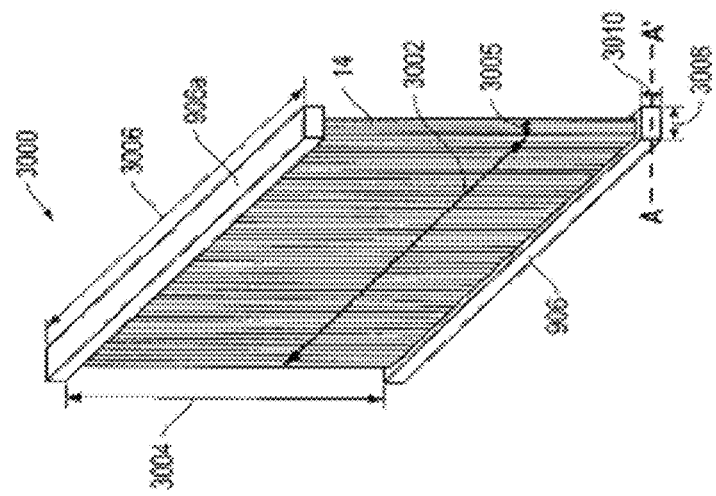
Figure 2:
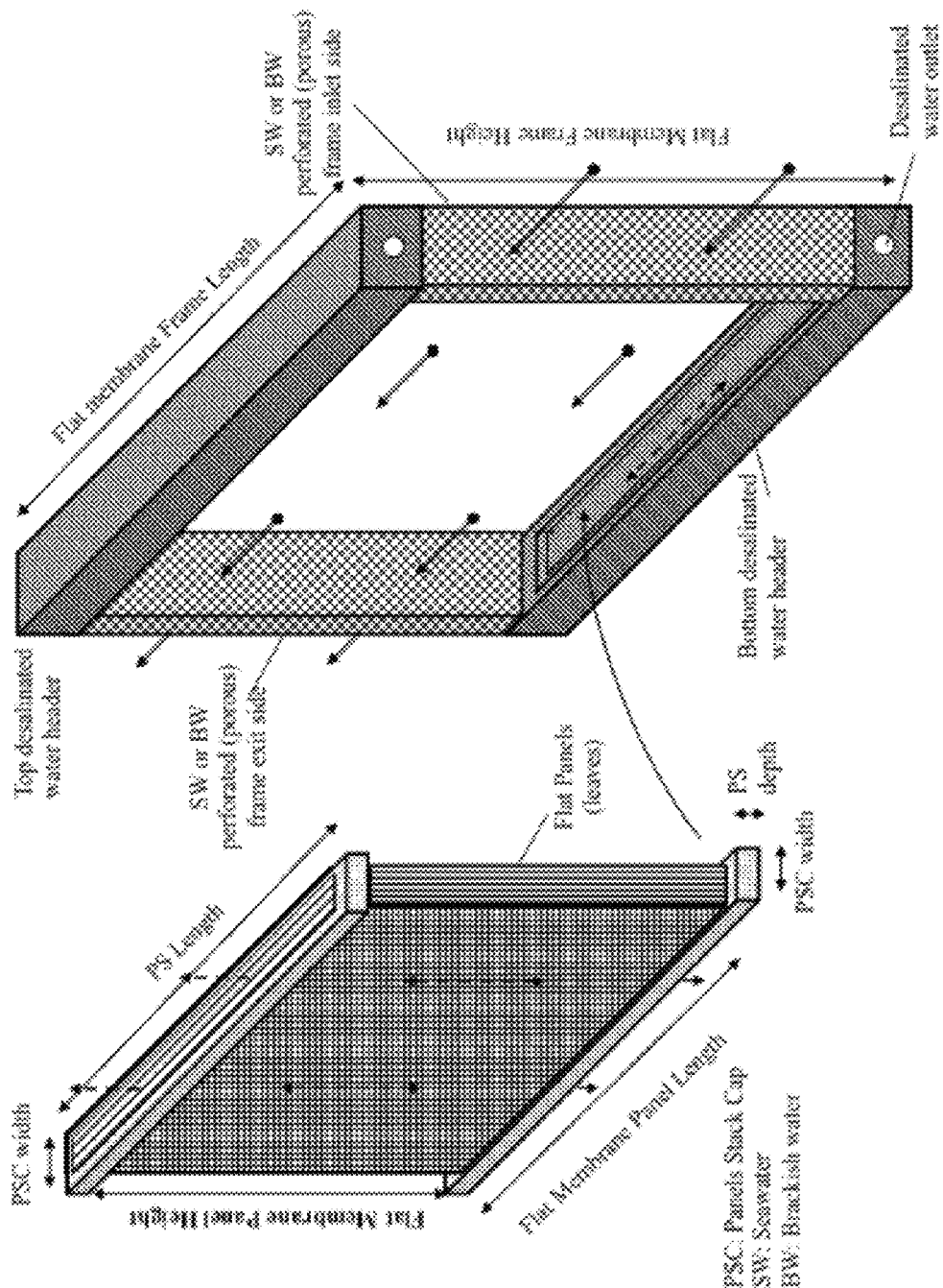
FIG. 2 is perspective views of prior art flat sheet RO panel assembly and flat sheet RO panels frame.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

In one embodiment, the application provides systems and processes of making same, for efficiently exchanging low or no solute solutions with high or hypersolute aqueous solutions. In one embodiment, the low or no solute solutions are saline solutions. The system may be used in a large variety of processes, including but not necessarily limited to water micro filtration, ultra-filtration, nanofiltration purification (reverse osmosis), extraction, salinity power generation and gas mixture separation (landfill gases as an example), and combinations thereof.

Referring now to the drawings and particularly to FIGS. 1-7, known systems and methods are described. Hollow fibers are generally more economical than other types of membrane design. Hollow fibers have the advantage of allowing for a large membrane area per unit volume. Accordingly, hollow fiber systems may be relatively compact systems. As best shown in FIG. 1, the hollow fiber (HF) panel 10 includes a frame 12 comprising a header 16, an opposed header 16a, and the membrane element 3000 retained within the frame 12. The membrane element 3000 includes a HF stack comprising a plurality of loosely packed hollow fibers (HFs) 14 comprising first ends extending through one contact structure 906 and opposed ends extending through an opposed contact structure 906a, each HF comprising an elongated lumen extending between the one contact structure 906 and the opposed contact structure 906a and comprising a hydrophilic semipermeable membrane adapted to achieve salt rejection of 98.5% or more and exhibiting a surface tension of 35 dynes/cm or more. The membrane element 3000 is adapted to be encased in a frame 12 for a HF panel 10 of FIG. 1. The plurality of loosely packed HFs 14 are adapted to be submersed in a first fluid and to sustain turbulence flow across and along surfaces of the plurality of loosely packed HFs 14 at a Reynolds' Number of about 3000 or more The loosely packed HFs 14 engaged at each end by the first and second contact structure (906, 906a) is adapted to provide fluid communication between lumens of the plurality of loosely packed HFs 14, the header 16, the opposed header 16a, and any adjacent frames and panels. The HF panel 10 is adapted for submersion in a first fluid and for induced osmosis between lumens of the plurality of loosely packed HFs 14 in the membrane element 3000 and the first fluid. The HF panel 10 has sufficient mechanical integrity to sustain turbulence flow across and along surfaces of the plurality of loosely packed HFs 14 at the Reynolds' Number of about 3,000 or more and to maintain said mechanical integrity at feed pumping pressures of 30 bars or higher.

In one embodiment, the frame 12 may have a variety of shapes (in frontal view) including, but not necessarily limited to circular, elliptical, triangular, and rectangular. In the embodiment shown in FIGS. 1 and 2, the frame 12 is square (in frontal view) and comprises a first header 16 and an opposed header 16*a*, and a first support 19 and second support 19*a*. In one embodiment, one or both of the first header 16 and the opposed header 16*a* have a depth 18.

The plurality of HFs 14 comprises a plurality of loosely packed individual HFs comprising a semipermeable membrane defining a lumen. In one embodiment, the semipermeable membrane is adapted to retain its mechanical integrity at higher feed pumping pressures across the lumens and higher process fluid pressures inside of the lumens compared to low-pressure microfiltration and ultrafiltration HF membranes currently in use in the industry.

The stack of loosely packed HFs 14 (the HF stack) in the membrane element 3000 has a width 3002, a height 3004, and a depth 3005. In one embodiment, the HF stack width 3002 is the same as the HF stack height 3004. In one embodiment, the HF stack width 3002 is about 3 meters. In one embodiment, the HF stack has a depth 3005 of from 40 to about 80 mm.

The contact structures 906, 906*a* or 1006 at each end of the loosely packed HFs 14 have a length 3006, a width 3008, and a thickness 3010. In one embodiment, the contact structure length 3006 is slightly larger than the HF stack width 3002, and the contact structure width 3008 is slightly larger than the HF stack depth 3005 to allow for proper support of the HF stack 14 on the frame of FIG. 19B. In one embodiment, the HF stack depth 3005 is 40-80 mm. In one embodiment, the HF stack depth 3005 is about ¾ of the contact structure width 3008. In one embodiment, the contact structure thickness 3010 is from about 20 to 60 mm, depending on operating pressure.

The frame 12 has a header 16 and an opposed header 16*a*. The frame has a frame width 3012, a frame height 3014, and a frame depth 3016. In one embodiment, the frame width 3012 is the same as the frame height 3014. In one embodiment, the frame depth 3016 is from about 1.5-2 times the contact structure width 3008 for proper support of the membrane element 3000.

The header comprises a solid structure 1000 with a bore 1008 therethrough. The solid structure 1000 may have a variety of shapes. Suitable shapes include, but are not necessarily limited to, triangular shapes, rectangular shapes, pentagonal shapes, hexagonal shapes, cylindrical shapes, oblong shapes, and the like. In one embodiment, the solid structure 1000 is an elongated rectangular structure. The bore 1008 also may have a variety of shapes. In one embodiment, the solid structure 1000 is an elongated rectangular structure with an elongated cylindrical bore 1008 therethrough.

The solid structure 1000 may be made of any suitable material. In one embodiment, the solid structure 1000 is made of steel. In one embodiment, the steel is coated with a suitable corrosion protection material. Substantially any corrosion protection material may be used. In one embodiment, the corrosion protection material is Teflon. In one embodiment, the corrosion protection material is epoxy. In one embodiment, the solid structure 1000 is made of fiber reinforced plastic. In one embodiment, a portion of a side of the solid structure comprises a contact structure 1006 adapted to retain the plurality of HFs 14 in a loosely packed arrangement. The contact structure 1006 may be any suitable material. In one embodiment, the contact structure 1006 comprises a suitable thermosetting material. In one embodiment, the contact structure 1006 is selected from the group consisting of epoxy, polyurethane, and combinations thereof.

In one embodiment, the plurality of hollow fibers 14 extend through a contact structure 906 or 1006 adapted to retain the plurality of HFs 14 in a loosely packed arrangement. The contact structure 906 or 1006. In one embodiment, the contact structure 906 or 1006 comprises a suitable thermosetting material. In one embodiment, the contact structure 906 is selected from the group consisting of epoxy, polyurethane, and combinations thereof. The ends of the hollow fibers 14 empty into the pipe 904.

The actual feed pressure to which the HF panel 10 comprising the HF membrane element 3000 will be exposed will differ depending upon the process being performed, the initial salinity of the process fluid and the feed, and the tie-line flow. Induced osmosis of water having salinity of 1% generates an osmotic head equivalent to 7.75 bars. At 6% salinity, the osmotic head is equivalent to 46.5 bars. In general, the sustainable feed pumping pressure must be sufficiently high to overcome this osmotic head. For example, in the case of desalination of seawater (3.5% salinity) by reverse osmosis, where concentrated brine leaves at 6% salinity and produces an osmotic pressure of 46.5 bars, the sustainable feed pumping pressure must be higher than the osmotic head of 6%.

The actual feed pressure to which the HF panel 10 comprising the HF membrane element 3000 will be exposed will differ depending upon the process being performed, the initial salinity of the process fluid and the feed, and the tie-line flow. Induced osmosis of water having salinity of 1% generates an osmotic head equivalent to 7.75 bars. At 6% salinity, the osmotic head is equivalent to 46.5 bars. In general, the sustainable feed pumping pressure must be sufficiently high to overcome this osmotic head. For example, in the case of desalination of seawater (3.5% salinity) by reverse osmosis, where concentrated brine leaves at 6% salinity and produces an osmotic pressure of 46.5 bars, the sustainable feed pumping pressure must be higher than the osmotic head of 6%.

In one embodiment, the semipermeable membrane maintains mechanical integrity at a feed pressure of: 30 bars or higher; 31 bars or higher; 32 bars or higher; 33 bars or higher; 34 bars or higher; 35 bars or higher; 36 bars or higher; 37 bars or higher; 38 bars or higher; 39 bars or higher; 40 bars or higher; 41 bars or higher; 42 bars or higher; 43 bars or higher; 44 bars or higher; 45 bars or higher; 46 bars or higher; 47 bars or higher; 48 bars or higher; 49 bars or higher; or, 50 bars or higher.

Figure 3:
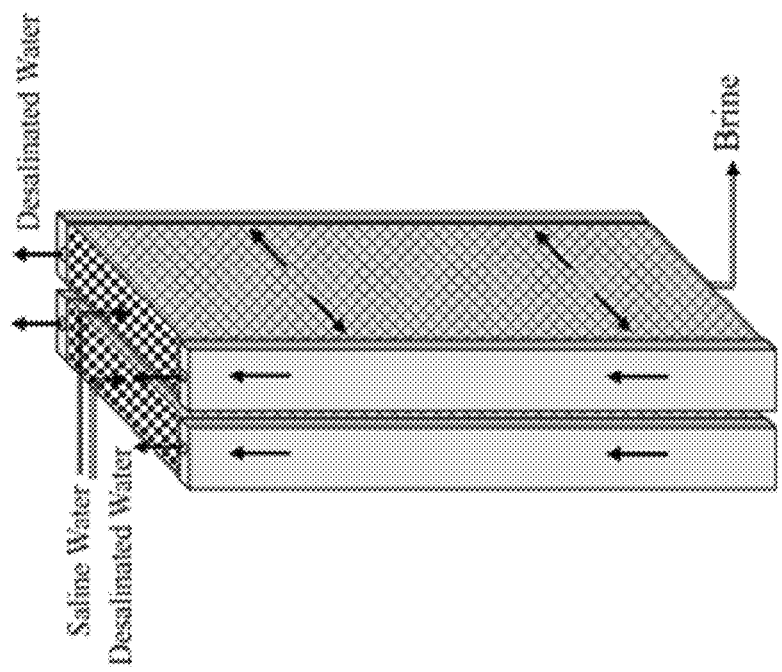
FIG. 3 is perspective views of prior art flat RO membrane frame.

As illustrated in FIG. 3, the HF panel 10 can abut an adjacent HF panel having a similar structure. The adjacent HF panel comprises a plurality of hollow fibers. The adjacent HF panel has a square frame comprising a first header and an opposed header, a first support and an opposed support. In one embodiment, the lengths of the plurality of hollow fibers in the adjacent HF panel can be parallel with or at an angle relative to the lengths of the plurality of hollow fibers 14 in the HF panel 10. The lengths two of the plurality of hollow fibers in the adjacent HF panel can be oriented substantially perpendicular to the lengths of the plurality of hollow fibers 14 in the HF panel 10. In this embodiment: the opposed header 16*a* of the HF panel 10 abuts the first support member of the adjacent HF panel; the header 16 of the HF panel 10 abuts the opposed support member (not shown) of the adjacent HF panel; the support member 19 of the HF panel 10 abuts the first header of the adjacent HF panel; and the support member 19a abuts the opposed header of the adjacent HF panel.

In one embodiment, header 16 comprises a first aperture 22 adjacent to support 19 and the opposed header 16a comprises an aperture 23 adjacent to opposed support 19a. The apertures 22, 23 may have a variety of shapes including, but not necessarily limited to circular, elliptical, triangular, rectangular, and combinations thereof. In one embodiment, the apertures 22, 23 are circular. In one embodiment of a power train, the aperture 22 communicates with a source of process fluid (not shown).

In one embodiment, the HFs are loosely packed between the first header 16 and the opposed header 16a, respectively. In one embodiment, the packing is sufficiently loose for feed to flow across the array substantially perpendicular to the HF panels at a given flow rate and feed capacity without stagnation, but sufficiently tight to provide the desired processing capacity. The frame 12 of the HF panel 10 comprises the headers 16, 16a and the supports 19, 19a, the frame of adjacent HF panel comprises the headers, and the support (and the opposed support, not shown).

The headers and supports comprise a material and structure having sufficient mechanical integrity to retain the plurality of HFs 14 when exposed to a substantially perpendicular flow of feed at a specified operating pressure. The frame 12, as well as other components, such as the array casing, may be made of a variety of materials including, but not necessarily limited to fiber reinforced plastic (FRP). Fiber-reinforced plastic (FRP) (also sometimes called fiber-reinforced polymer) is a composite material made of a polymer matrix reinforced with fibers. Common fibers include, but are not necessarily limited to glass, carbon, basalt, aramid, paper, wood, asbestos, and the like. In one embodiment, the fibers are selected from the group consisting of glass, carbon, basalt, aramid, and combinations thereof. Common polymers include, but are not necessarily limited to thermosetting plastics selected from the group consisting of epoxy, vinyl ester, polyester, phenol-formaldehyde resins, and combinations thereof.

Suitable FRP's meet or exceed the mechanical properties of steel. In one embodiment, the FRP exhibits superior thermo-mechanical properties, is light weight, is relatively low cost, exhibits corrosion resistance, and is easy to maintain. In one embodiment, headers and supports are made of the same material. In one embodiment, the headers and supports are made of different materials. In one embodiment, the headers and/or supports are made of steel. In one embodiment, the headers and/or supports are made of FRP. In one embodiment, the headers and the supports are made of FRP.

The membrane element and HF panel are useful in a variety of ISO systems and processes. Suitable ISO systems and processes include, but are not necessarily limited to those for ISO power generation, reverse osmosis, desalination, and water extraction from diluted organic, contaminated groundwater and industrial solutions. The HF panel 10 is particularly useful to perform large scale ISO processes. In one embodiment, the process fluid (or fluid inside of the HF lumen) is at a relatively high pressure and the feed (or fluid outside of the lumen) is at a relatively low pressure.

Figure 4:
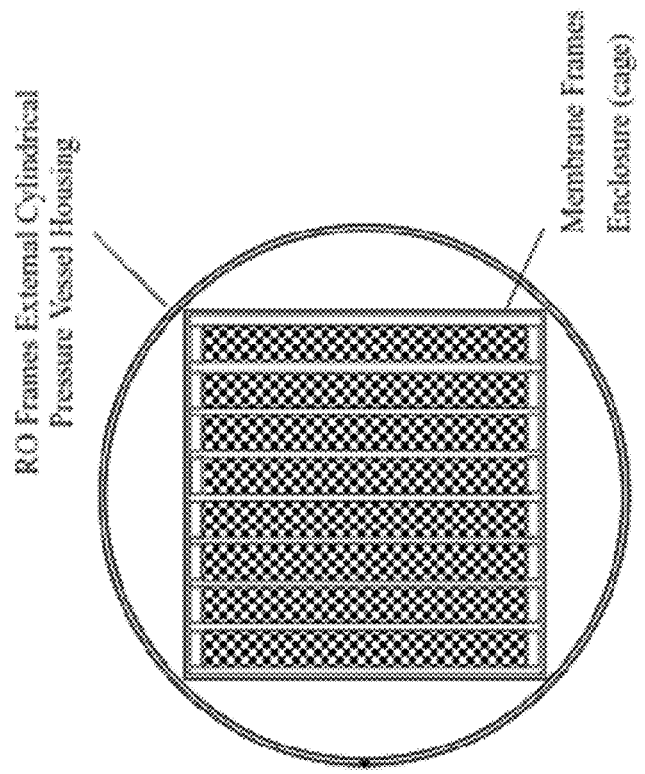
FIG. 4 is a cross-sectional view of prior art of a Type 1 frame layout for small vessels-single size membranes that occupies 64% of the vessel's section.
Figure 6:
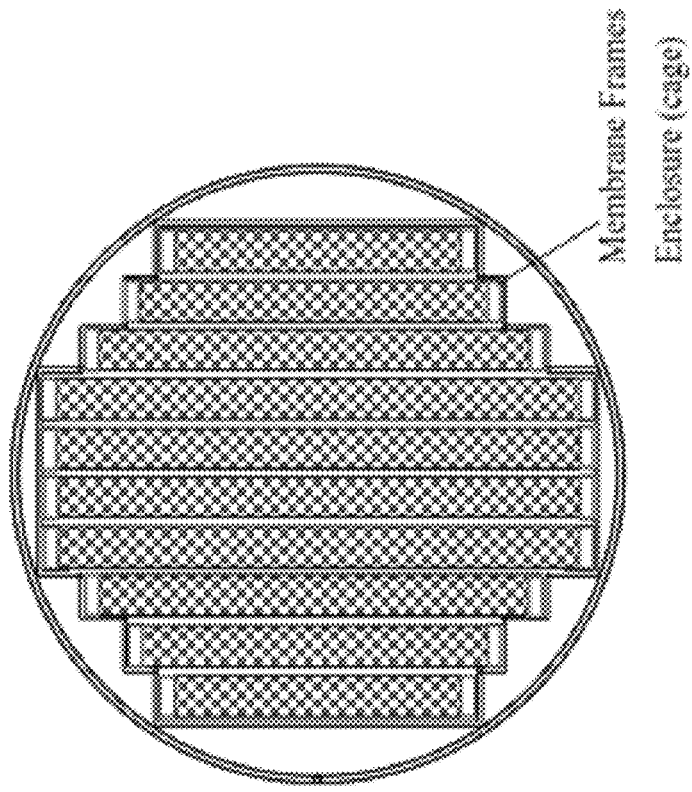
FIG. 6 is a cross-sectional view of prior art of a Type 3 frame layout with multiple membrane sizes that occupies a large exchange surface.
Figure 5:
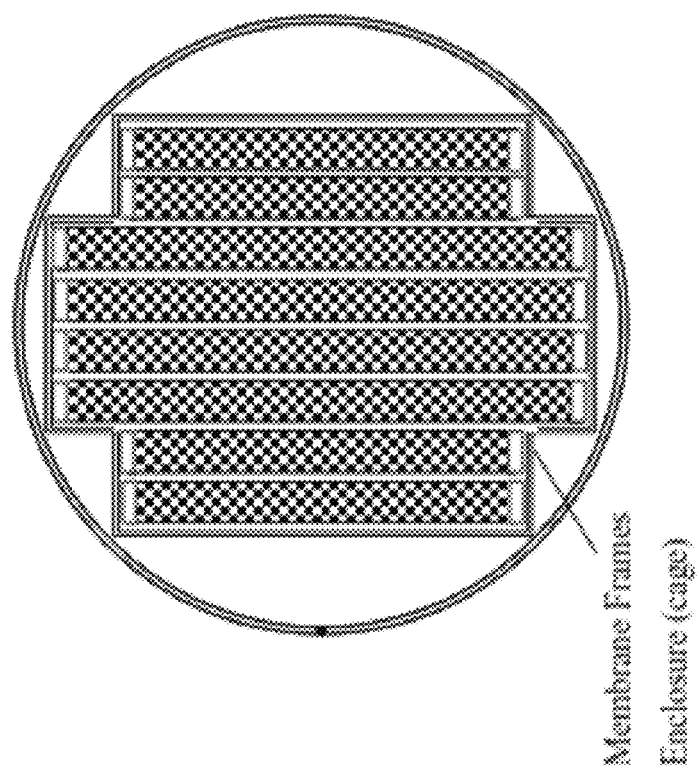
FIG. 5 is a cross-sectional view of prior art of a Type 2 frame layout with two membrane sizes.

The salinity (or solute concentration) of the process fluid and the feed will vary. The process fluid for an extraction process typically has a moderate salinity. In one embodiment, the moderate salinity is from about 3% to about 7%. The process fluid for osmotic power generation and/or seawater desalination by reverse osmosis will have a low salinity, typically less than about 3%. In one embodiment, the process fluid is at a relatively low pressure and the initial feed is at a relatively high pressure. In one embodiment, the process fluid is at a relatively low pressure of from about 3 bars to about 5 bars and the feed is at a relatively high pressure of from about 10 bars to about 60 bars or more, depending of on feed salinity FIGS. 4-6 illustrate an enclosure cage capable of enclosing a variety of membrane frame configurations including different configurations and/or widths of HF panels secured in the frame. FIG. 4 best illustrates a Type 1 simple frame layout for small vessels utilizing single size HF membranes that occupy about 64% of the vessel's interior volume or section. FIG. 5 best illustrates a Type 2 frame layout for small vessels utilizing two HF membrane sizes that occupies more of the vessel's interior volume or section than Type 1. FIG. 6 best illustrates a Type 3 frame layout for large exchange surface utilizing multiple HF membrane sizes that occupies more of the vessel's interior volume or section than Type 2.

Figures 7, 8:
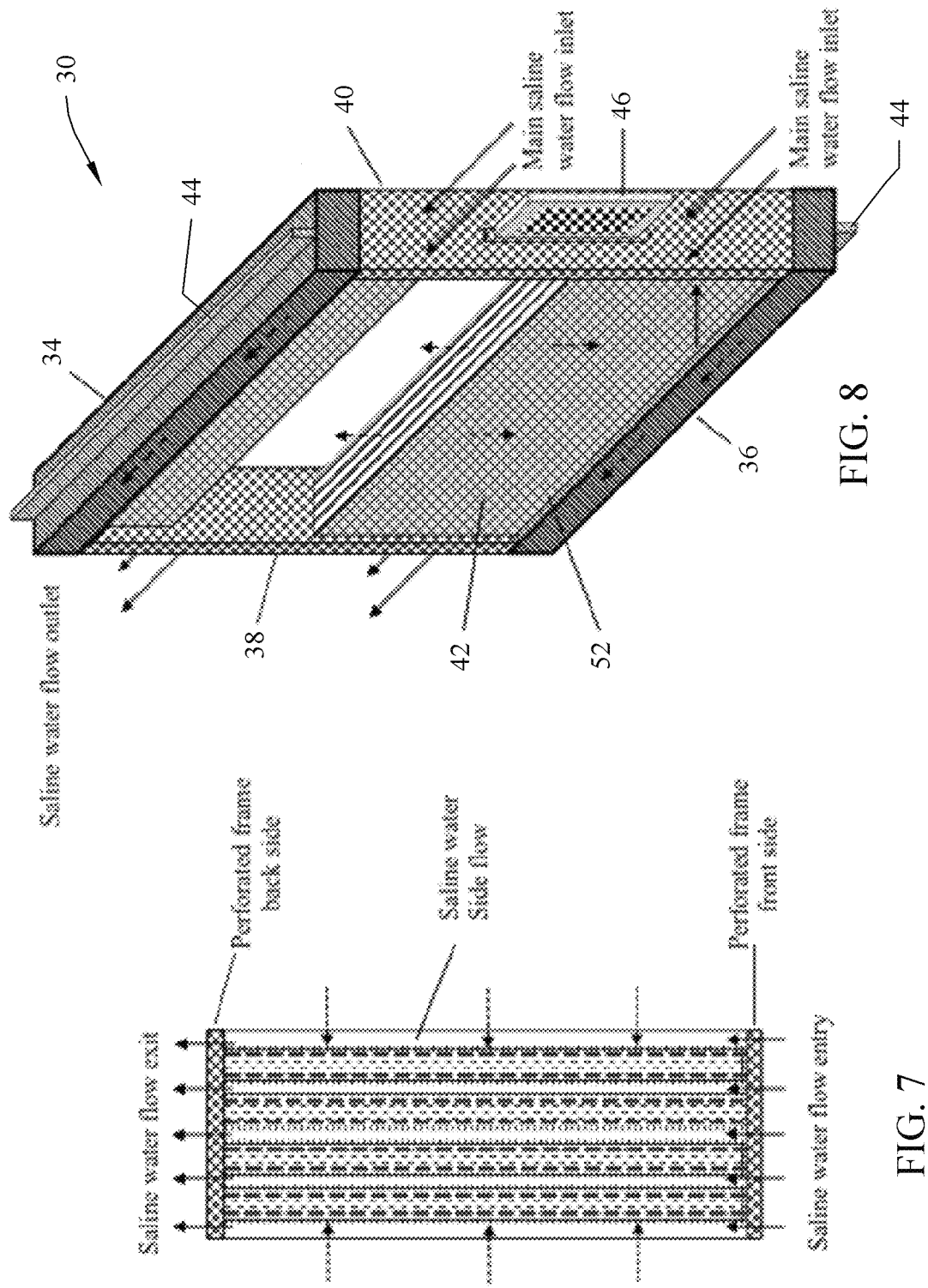
FIG. 7 is a cross-sectional view of prior art of a stack of flat RO membrane panels.
FIG. 8 is a perspective view of a flat RO membrane frame with multiple panels of the present technology.

Referring to FIG. 7, this illustrates a top cross-section of a stack of flat RO membrane panels. The back and front sides of the frame can be perforated allowing for entry and exit of saline water flow. The sides of the HF panels are capable of allowing a side flow of the saline water.

The above known systems and processes are defined herein and more fully described in U.S. Pat. Nos. 8,545,701; 8,852,432; 9,156,003; and International Application Number PCT/IB2014/058861.

These together with other objects of the present technology, along with the various features of novelty that characterize the present technology, are pointed out with particularity in the claims annexed to and forming a part of this disclosure. For a better understanding of the present technology, its operating advantages and the specific objects attained by its uses, reference should be made to the accompanying drawings and descriptive matter in which there are illustrated embodiments of the present technology. Whilst multiple objects of the present technology have been identified herein, it will be understood that the claimed present technology is not limited to meeting most or all of the objects identified and that some embodiments of the present technology may meet only one such object or none at all.

Referring now to the drawings, and particularly to FIGS. 8-33, an embodiment of the induced symbiotic osmosis systems and processes of the present technology is shown and generally designated.

In FIG. 8, a new and novel RO membrane 30 of the present technology is illustrated and will be described. More particularly, the RO membrane 30 includes a frame 32 including a top header 34, an opposed bottom header 36, a perforated or porous frame back side 38, a perforated or porous frame front side 40, and one or more flat RO panels 42.

The headers 34, 36 each include a guiding bar 44 extending outwardly therefrom. The frame front site 40 can include a foldable, pivotable, retractable or removable handle 46. It can be appreciated that the handle 46 can be included with the frame back side 38. The guide bars 44 can be configured to be slidable received in a corresponding slot, groove or channel in an enclosure configured to receive the RO membrane 30.

The frame back and front sides 38, 40 are configured to allow saline water to flow therethrough. The RO panels 42 are configured to allow saline water to flow perpendicularly therethrough to create a saline water side flow, and laterally to create a saline water flow between the back and front sides 38, 40 and to the headers 34, 36. The top and bottom headers 34, 36 are configured to operate at or with an external pressure of 1000 psi or greater.

Figure 9:
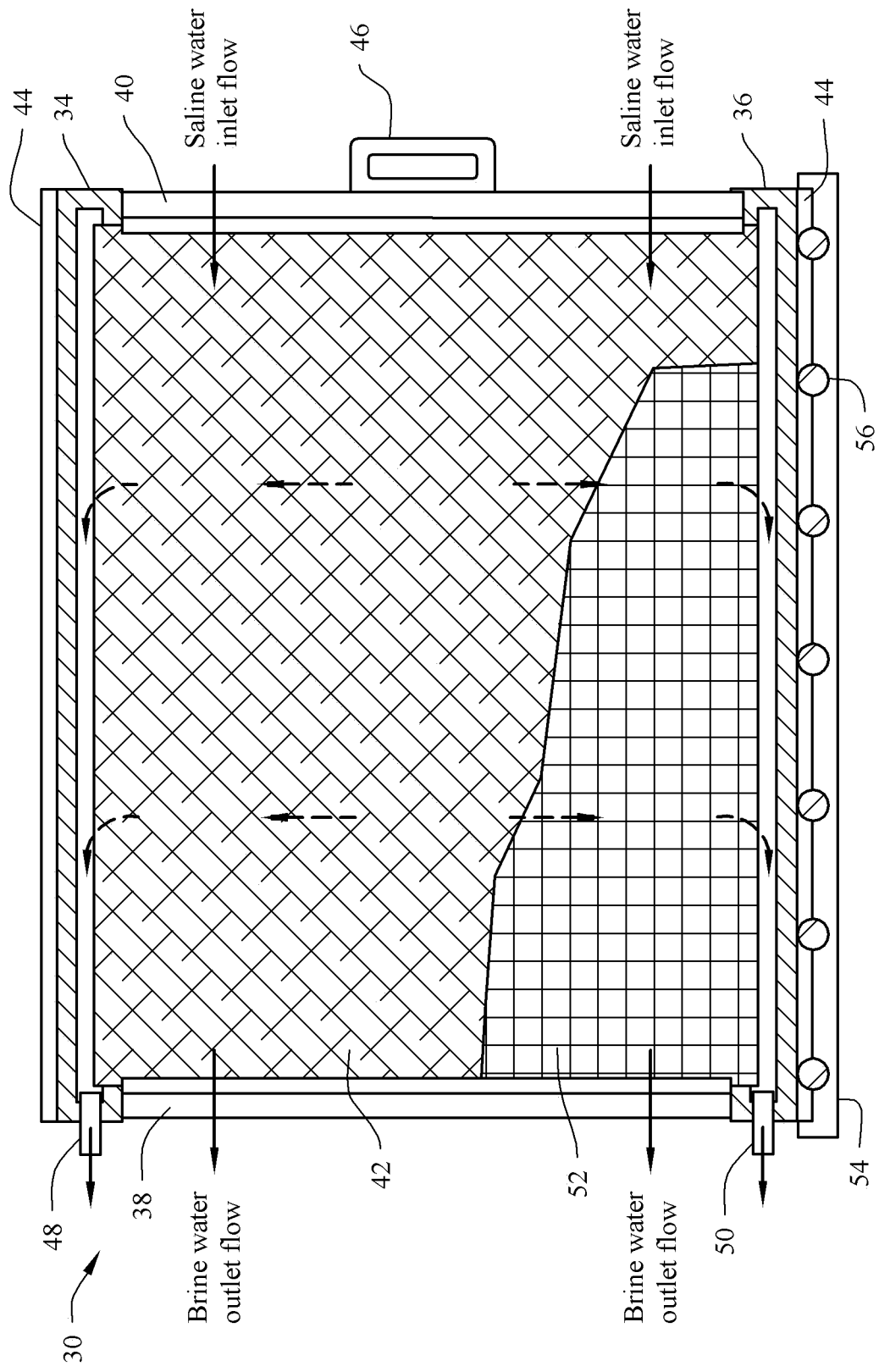
FIG. 9 is a cross-sectional view of a flat RO membrane rectangular frame of one or more flat RO membrane panels of FIG. 8 of the present technology.

Referring to FIG. 9, the top header 34 defines an interior cavity configured to receive a desalinated water flow from the RO panels 42. A desalinated water outlet 48 is associated with the top header 34 and is in communication with the cavity to provide an outlet flow of desalinated water. The bottom header 36 defines an interior cavity configured to receive a desalinated water flow from the RO panels 42. A desalinated water outlet 50 is associated with the top header 36 and is in communication with the cavity to provide an outlet flow of desalinated water.

A screen 52 can be provided on either side of the RO panel 42, or which is received and/or secured with the top and bottom headers 34, 36. The screen 52 is configured to reinforce and protect the RO panel 42, while allowing side flow of saline water.

In use, saline water inlet flow can enter the RO membrane 30 from the perforated front side 40, then travels across the length the RO panel 42, where the saline water is desalinated into a desalinated water outlet and a brine water outlet flows. The desalinated water outlet flow travels to the top and bottom headers 34, 36 and exits through their corresponding outlets 48, 50. The brine water outlet flow travels toward and exits the frame back side 38.

A RO membrane frame mounting 54 can be utilized to receive one or more RO membranes 30. The frame mounting 54 includes a slot, channel or notch that is configured to longitudinal receive at least one of the frame guiding bars 44. Rollers or ball bearings 56 are associated with the frame mounting 54 to facilitate sliding in/out of the RO membrane 30. It can be appreciated that the frame mounting 54 can be utilized with the top and/or bottom headers 34, 36, and can be used in a stacking configuration to allow multiple RO membranes 30 to be utilized in series.

The handle 46 provides for easy insertion and/or removal of the RO membrane 30 from the frame mounting 54. The edges of the RO panels 42 can be sealed to their respective side frames 38, 40 by a vertical edge epoxy sealing sleeve.

Figure 10:
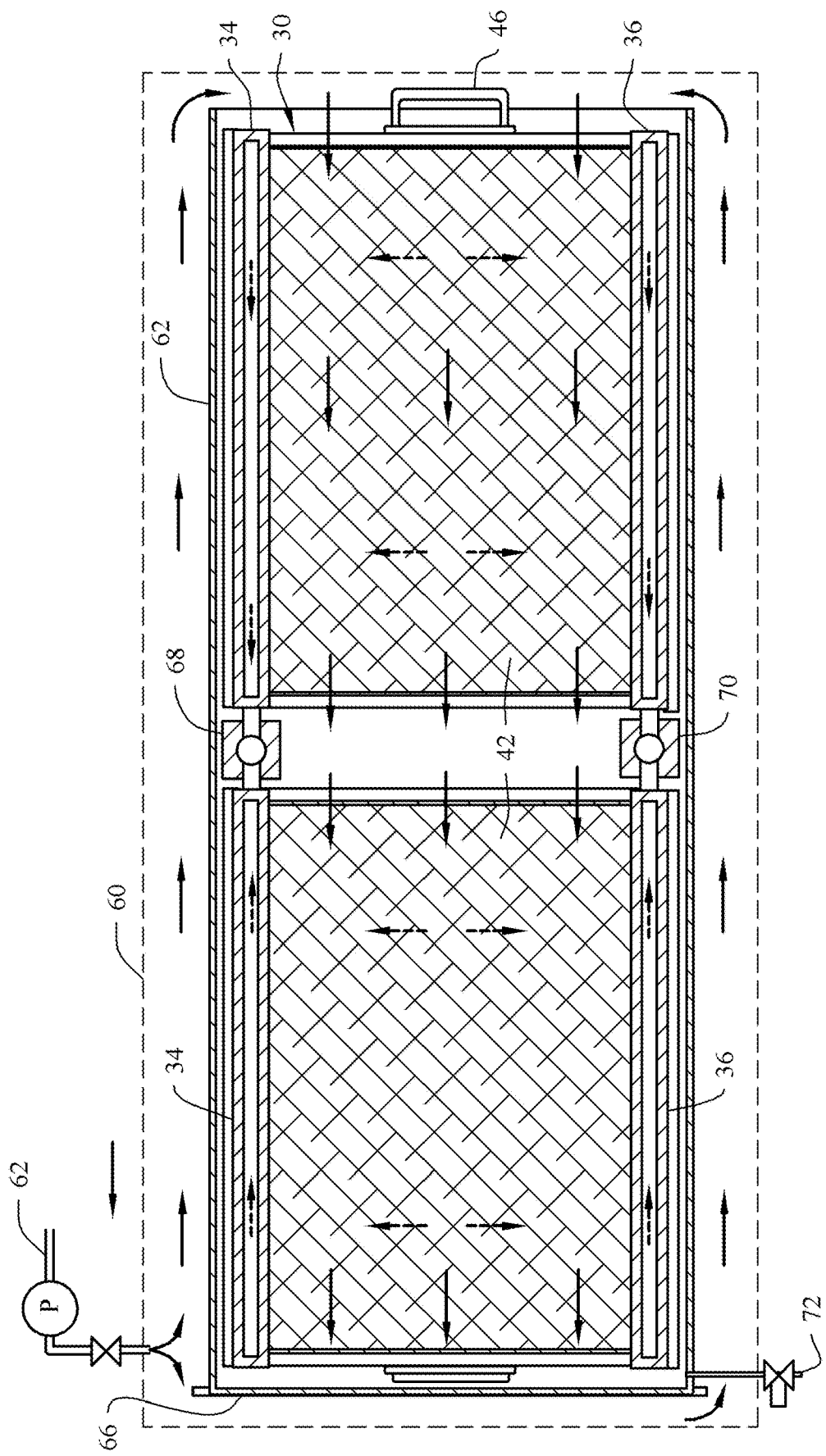
FIG. 10 is a cross-sectional view of a twin RO staked sequential or independent desalination frames of the present technology.

Referring to FIG. 10, a twin RO staked sequential or independent desalination frame is described, which includes a RO membrane pressure vessel 60 that receives ultra-filtered saline water 62 by way of a pump (P) and valve. Inside the pressure vessel 60 is one or more frame enclosures or cages 64 featuring a closed end 66 and an open end configured to slidable receive a connected pair or stacked RO membranes 30.

The top headers 34 of the twin stacked RO membranes 30 are in communication with a desalinated water top collector header 68. The bottom headers 36 are in communication with a desalinated water bottom collector header 70. The desalinated water collector headers 68, 70 position the twin RO membranes 30 in a spaced apart relationship, while inserted in the enclosure 64.

The saline water 62 flows into the pressure vessel 60, around the enclosure 64 and into its open end. The saline water then flows through the perforated frame flow entry side 40 of a first RO membrane 30, then passes through the RO panel 42 with desalinated water entering the top and bottom headers 34, 36 and then to their respective desalinated water collector headers 68, 70. Saline or brine water exits the first RO membrane 30v via its perforated frame flow exit side 38, and then enters the second RO membrane 20 by way of its perforated frame flow entry side 38. The saline or brine water then passes through the RO panel 42 with desalinated water entering the top and bottom headers 34, 36 and then to their respective desalinated water collector headers 68, 70. Brine water exits the second RO membrane 30 via its perforated frame flow exit side 40 and exits the enclosure 64 by way of a brine outlet back pressure control 72.

Figure 11:
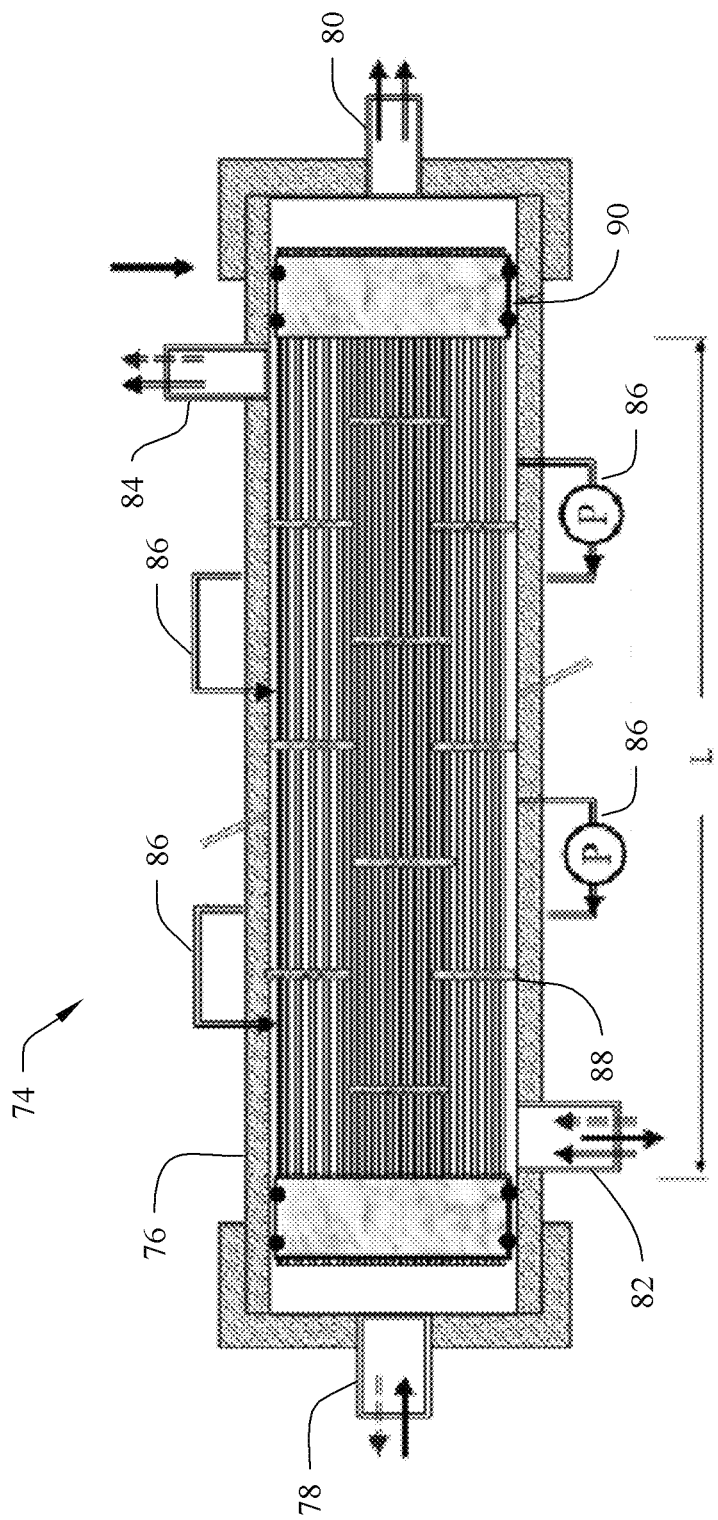
FIG. 11 is a cross-sectional view of an improved piperack mounting with counter-current of the present technology.

Regarding FIG. 11, this embodiment represents a design of a membrane exchanger for pipe rack installation of a piperack mounted co-current or counter-current hollow fiber membrane module 74, including hollow fiber or flat sheet exchangers for fluids filtration and osmotic processes. The hollow fiber or flat sheet exchangers can be based on rolling a layer 76 (10-15 mm) of segregated hollow fibers or flat sheet membranes, of large width to header depth ratio. The rolled membrane bundle 76 can be inserted or received in conventional membranes cylindrical vessel or shell 77. The bundle 76 can be made by forming a pad of about 10-15 mm of segregated hollow fibers and rolling the pad in the form of a cylinder of a desired diameter, forming a membrane module of several centimeters in diameter (10-30 cm i.e., 4-12 inches). The shell 77 can be rated at around 800 psi operations or greater.

Such assembly and fabrication of membranes enhance exchanger efficiency, retard fouling and improve membrane cleaning, particularly when the raw water pumping pressure is frequently isolated according to a programed cycle to flush the membrane.

Segregation of hollow fibers is essential and can be done by randomly distributed, flexible PVC or CPE glued filaments or strips with OD or depth of about 1 mm or less. Then, the assembled rolled membrane module 76 can be inserted in the cylindrical vessel 77 of the type being currently used in osmotic processes. Framed flat sheet membranes may be used in large dimeter vessels, where membrane surface width is significantly wider than the said membrane framing headers.

The closed vessel 77 includes a low pressure low salinity feed 78, a low pressure high salinity output 80, a high pressure diluted bring high flow 82, and a high pressure high salinity brine flow 84.

Localized mounted, low pressure reversible flow pumps 86 enhances turbulence and reduce membranes fouling. Flexible PVC, CPE turbulence baffles 88 can be placed inside the shell 77 to further enhance turbulence and reduce membranes fouling. An HF epoxy sheet (potting seal) 90 can be utilized at the ends of the rolled bundle 76, which can seal against an interior surface of the shell 76.

This ISO Module 74 can be also mounted vertically on a structural base with some modifications of inlet and outlet flow ports. Such system can potentially replace conventional seawater RO rolled membrane sheets.

In this process, interrupting the desalination cycle for few minutes, will allow some of the desalinated salt free water to reverse flow across the membrane to flush the accumulated sludge on the raw water side of the membrane by "osmosis", where this sludge would be directed to waste water disposal facility.

Flat sheet membranes of variable circumferential length, in the form of a continuous folded sheet, or assembly of segregated variable height plates can be also used.

Operation considerations of the piperack mounting counter-current module 74 can be associated with an osmotic system. Hollow Fiber-ISO Module material is based on food grade polyvinyl chloride (PVC), chlorinated polyethylene (CFE) or equivalent that are used for forming filaments of porous mesh between membrane hollow fiber layers, as well as for providing semi-ridged baffles for controlling flow pattern and prevent areas of stagnation.

The module 74 can be used potentially in more than one application.

1) Power Generation Mode (⟶): In the case described earlier, desalinated water crosses membranes from "the low pressure-low salinity tube feed" 78 to "the high pressure, high salinity-high flow rate vessel shell side" 84 by osmosis, where such high flow-high pressure stream can drive a hydraulic turbine to generate osmotic power and low pressure reduced salinity flow.

2) Desalination Mode (==⟶): In another case, the same vessel can be used to desalinate brackish and seawater. Here, the outlet of high pressure diluted brine-high flow 82 will be used to flow high rate of brackish water or seawater on the shell side, in a reverse order to the power generation case, where the desalinated water crosses flat sheet or hollow fiber membranes and exists from the low pressure low salinity side 78 and the concentrated brine exists from the high pressure high salinity brine shell side port 84.

3) Desalination Mode (==⟶), the same vessel can be used to desalinate brackish and seawater. Here the diluted high flow brine or seawater and brackish water are pumped in the shell side under pressure to desalinate such stream by reverse osmosis, leaving from the inlet that was used for high pressure, high salinity brine 84, meanwhile desalinated water crosses hollow fiber membranes and exists from the low pressure high salinity brine port 80, as in the case of power generation.

Here Case 2 and 3 are shifting the side of the exchanger that can be used.

Figure 12:
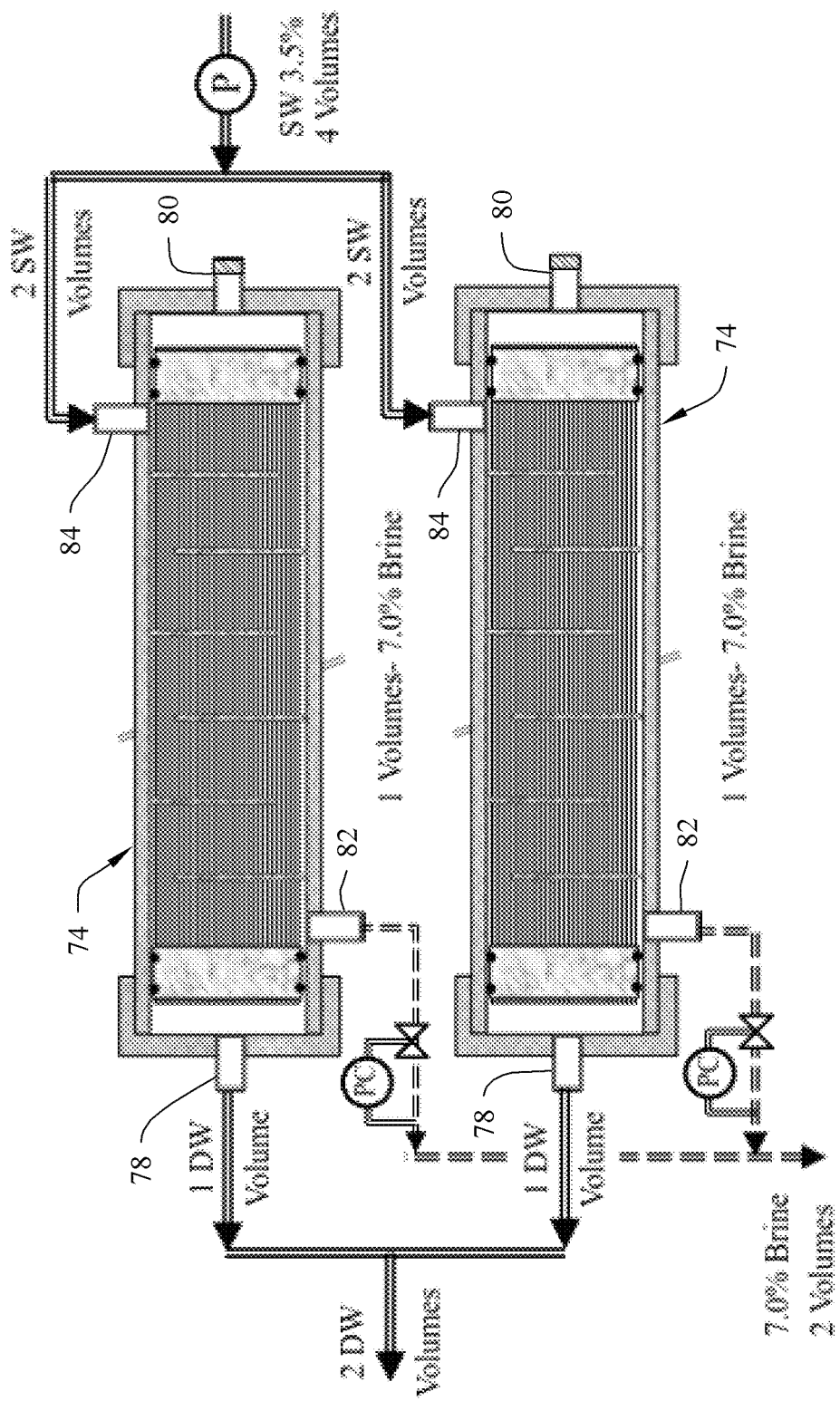
FIG. 12 is a cross-sectional view of an exemplary mounting of the piperack of FIG. 11 for 50% desalinated water recovery.

FIG. 12 is exemplary of the piperack mounting, counter-current module 74, with parallel, same size, hollow fiber ISO modules with 50% desalinated water recovery, per FIG. 11. This system can be also mounted vertically if adequate space is available. Localized flow turbulence are not shown.

In operation, saline water is pumped at 4 volumes into the high pressure salinity flow 84 of each of the parallel modules 74, resulting in each module receiving 2 saline water volumes. The saline water proceeds through each rolled bundle 76, where brine exits via flows 82 at 7.0% brine and 2 volumes. Desalinated water exits from each of the low pressure low salinity sides 78 at 1 volume.

Figure 13:
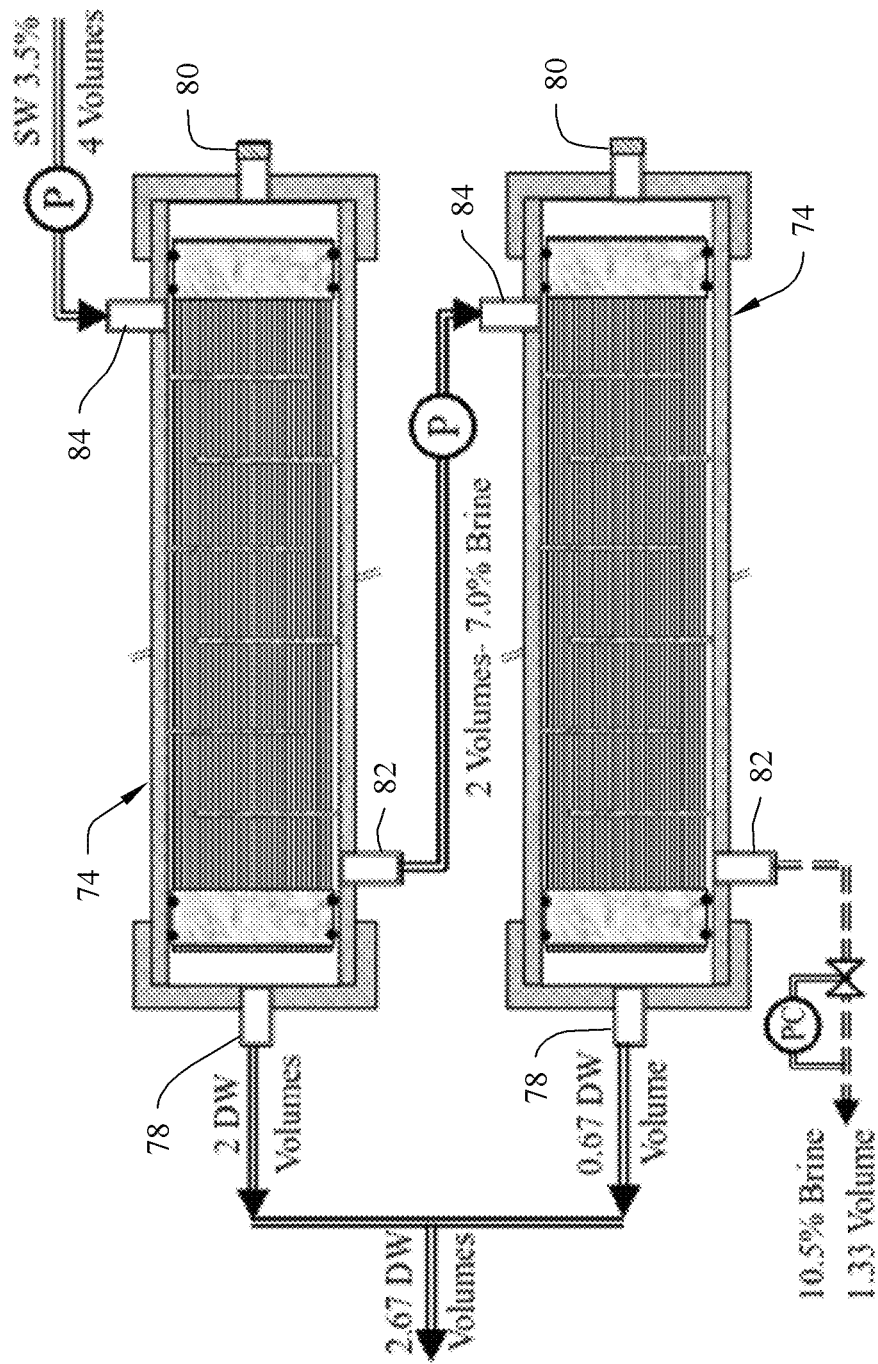
FIG. 13 is a cross-sectional view of an exemplary mounting of the piperack of FIG. 11 for 75% desalinated water recovery.

FIG. 13 is exemplary of the piperack mounting, counter-current module 74, with cascade, variable size, hollow fiber ISO module or flat sheet-ISO module for 67% desalinated water recovery, per FIG. 11. This system can be also mounted vertically if adequate space is available.

In operation, saline water is pumped at 4 volumes into the high pressure salinity flow 84 of a first of the cascading modules 74. The saline water proceeds through the rolled bundle 76 of the first module 74, where brine exits via flow port 82 at 7.0% brine and 2 volumes, which then enters the high pressure salinity flow 84 of a second of the cascading modules 74. Desalinated water exits from the low pressure low salinity sides 78 of the first module 74 at 2 volumes.

The saline water proceeds through the rolled bundle 76 of the second module 74, where brine exits via flow port 82 at 10.50% brine and 1.33 volume. Desalinated water exits from the low pressure low salinity sides 78 of the second module 74 at 0.67 volumes.

Typical membrane modules design of induced symbiotic osmosis power (ISOP) or symbiotic reverse osmosis (SRO) plants employing hollow fiber membrane frame (HFM) or flat sheet membrane (FSM) to sustain flow Reynolds Number of 3,000-3,500. The System can be mounted indoor or outdoor, on piperack, or vertically mounted.

Figure 14:
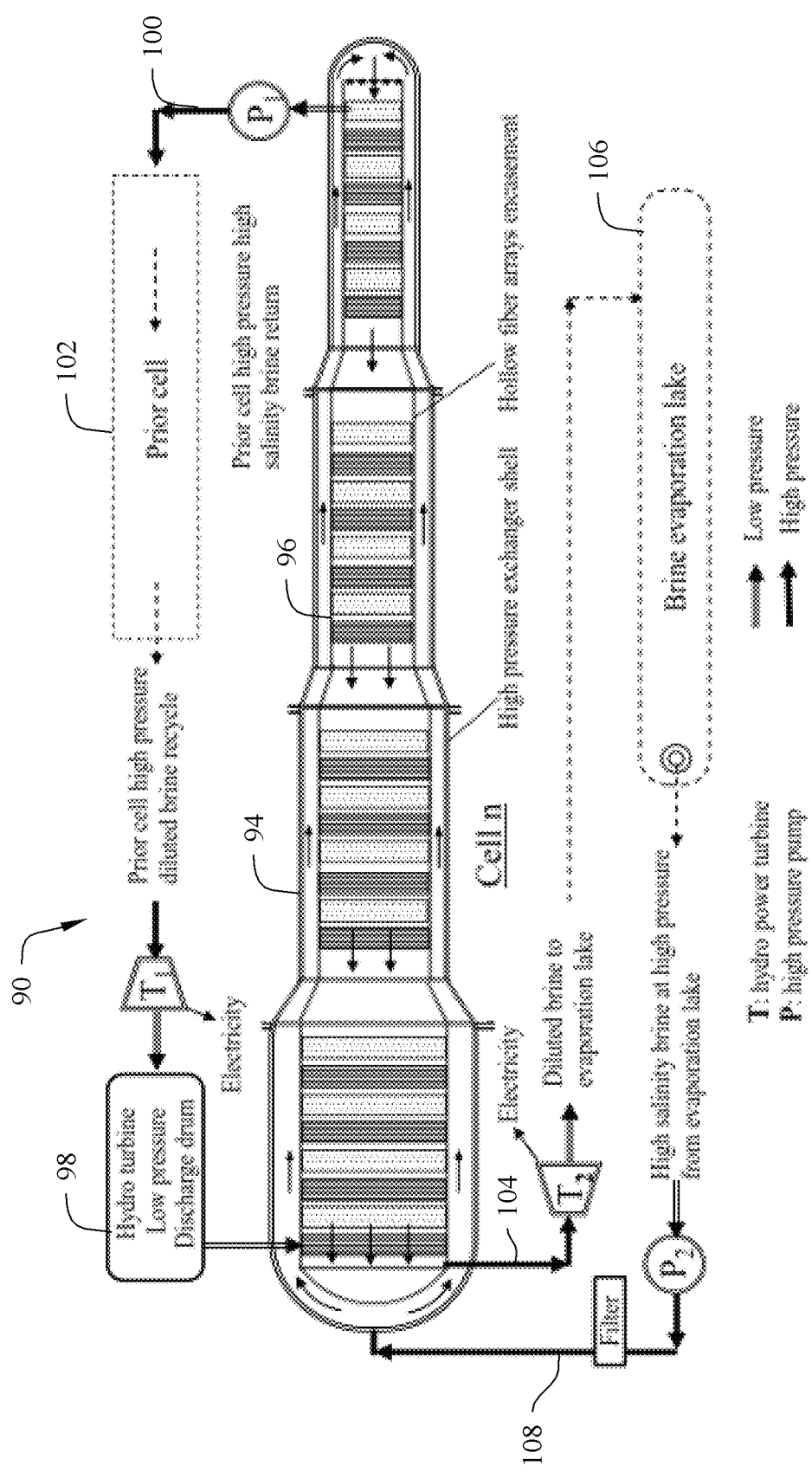
FIG. 14 is a cross-sectional view of membrane modules for ISOP or SRO plants utilizing hollow fiber membrane frame or flat sheet membrane to sustain a flow Reynolds Number of 3,000-3,5000.

Referring to FIG. 14, represents an embodiment of a membrane module 92 including axial flat sheet membranes (FSM) of variable flow reverse osmosis scheme, relying on step change in the vessel diameter to sustain flow velocity and avoiding excessive membrane fouling by sustaining Reynolds Number requirement. The module 92 includes a high pressure exchanger shell 94 featuring varying diameter sections, preferable decreasing in size from one end to another end. Each section of the shell 94 encloses a hollow fiber array encasement 96, with each encasement employing Hollow Fiber Membrane Frame (HFM), Flat Sheet Membrane (FSM) or rolled membranes. Each encasement 96 is located within its corresponding section to define an annulus between an outer surface the encasement 96 and the shell 94.

Typical membrane modules design of ISOP or SRO Plants employ HFM or FSM to sustain flow Reynolds Number of 3,000-3,500. The System can be mounted indoor or outdoor, on piperack, or vertically mounted.

A hydro turbine low pressure discharge drum 98 feeds high pressure diluted brine into a first HF array encasement of a first diameter, while high pressure high salinity brine is pumped ($P_1$) from a final HF array encasement 96 via a return line 100. The final HF array encasement has a diameter, which is smaller than the first diameter. The high pressure high salinity brine then travels to a prior cell 102, which dilutes the brine. The high pressure diluted brine from the prior cell 102 to travels to a turbine ($T_1$) which produces electricity, and then exits to the discharge drum 98.

Diluted brine exits the first FH array encasement 96 via line 104, and then travels to a turbine ($T_2$) which produces electricity, and then exits to a brine evaporation lake or pool 106. High salinity brine at high pressure is pumped ($P_2$) from the evaporation lake 106, through a filter, and then enters the annulus of adjacent the first HF array encasement 96. The high salinity brine travels along the annulus to the final HF array encasement and enters the final HF array encasement. The high salinity brine then travels through each cascading HF array encasement 96 where it exits as diluted brine via line 104.

Figure 15:
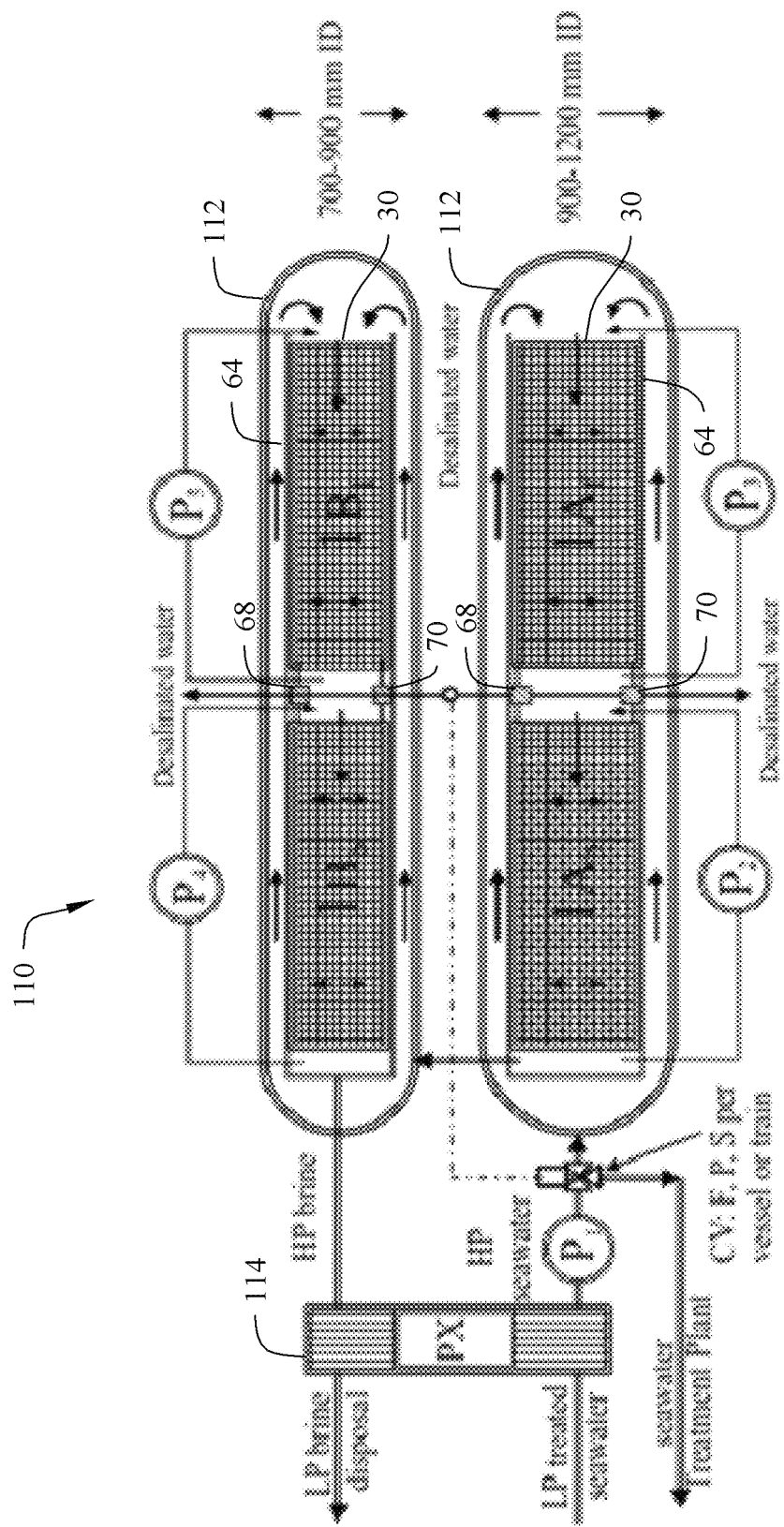
FIG. 15 is a cross-sectional view of agitated axial flow sheet membranes with variable flow RO scheme of the present technology.

FIG. 15 represents an agitated axial flat sheet membranes (FSM) variable flow reverse osmosis scheme 110, which can provide fouling control of membranes. This scheme can include horizontal vessels 112 each including a diameter sized to maintain relatively the same velocity in every vessel. Internal circulation pumps ($P_2, P_3, P_4, P_5$) are utilized for maintaining flow recycle at a Reynold's number above 3000 to mitigate fouling. Each vessel 112 includes the twin RO staked sequential or independent desalination modules 64 of FIG. 10.

An automated backflush of the membrane can be achieved with desalinated water, while releasing pressure on seawater supply and returning it to pretreatment. Backflush is activated by inadvertent reduction in desalinated water flow rate, changes in its salinity or changes in seawater pressure.

Low Pressure (LP) treated seawater can enter a pressure exchanger (PX) 114 for brine pressure power recovery, via a pump ($P_1$). A control valve (CV) controls the flow of the treated seawater leaving the pressure exchanger 114 to a seawater treatment plant and/or to one of the vessels 112, with control valve being controlled by an attribute of a flow in a connection line leading from the first vessel to the second vessel.

The high pressure seawater enters an annulus of the first vessel 112, and is processed through the twin RO modules 64, as described above. Desalinated water exits the closed end of the frame enclosure of the first vessel 112 and enters an annulus of the second vessel 112. Internal circulation pump ($P_2$) recirculates flow from the closed end of the frame enclosure of the first vessel 112 to the space defined between the twin RO membranes 30. While circulation pump ($P_3$) recirculates flow from the space defined between the twin RO membranes 30 to an area adjacent the open end of the frame enclosure. Desalinated water can exit the top collector header 68 and the bottom collector header 70. The desalinated water exiting the top collector header 68 can be in communication with the bottom collector header 70 of the RO module 68 of the second vessel 112.

The desalinated water entering the annulus of the second vessel 112 is processed through its twin RO module 64, as described above. Internal circulation pump ($P_4$) recirculates flow from the closed end of the frame enclosure of the second vessel 112 to the space defined between the twin RO membranes 30. While circulation pump ($P_5$) recirculates flow from the space defined between the twin RO membranes 30 to an area adjacent the open end of the frame enclosure. Desalinated water can exit the top collector header 68 and the bottom collector header 70.

High pressure brine exits the closed end of the frame enclosure of the second vessel 112 and enters the pressure exchanger 114, which reduces its pressure and exits as low pressure brine disposal.

Figures 16, 17:
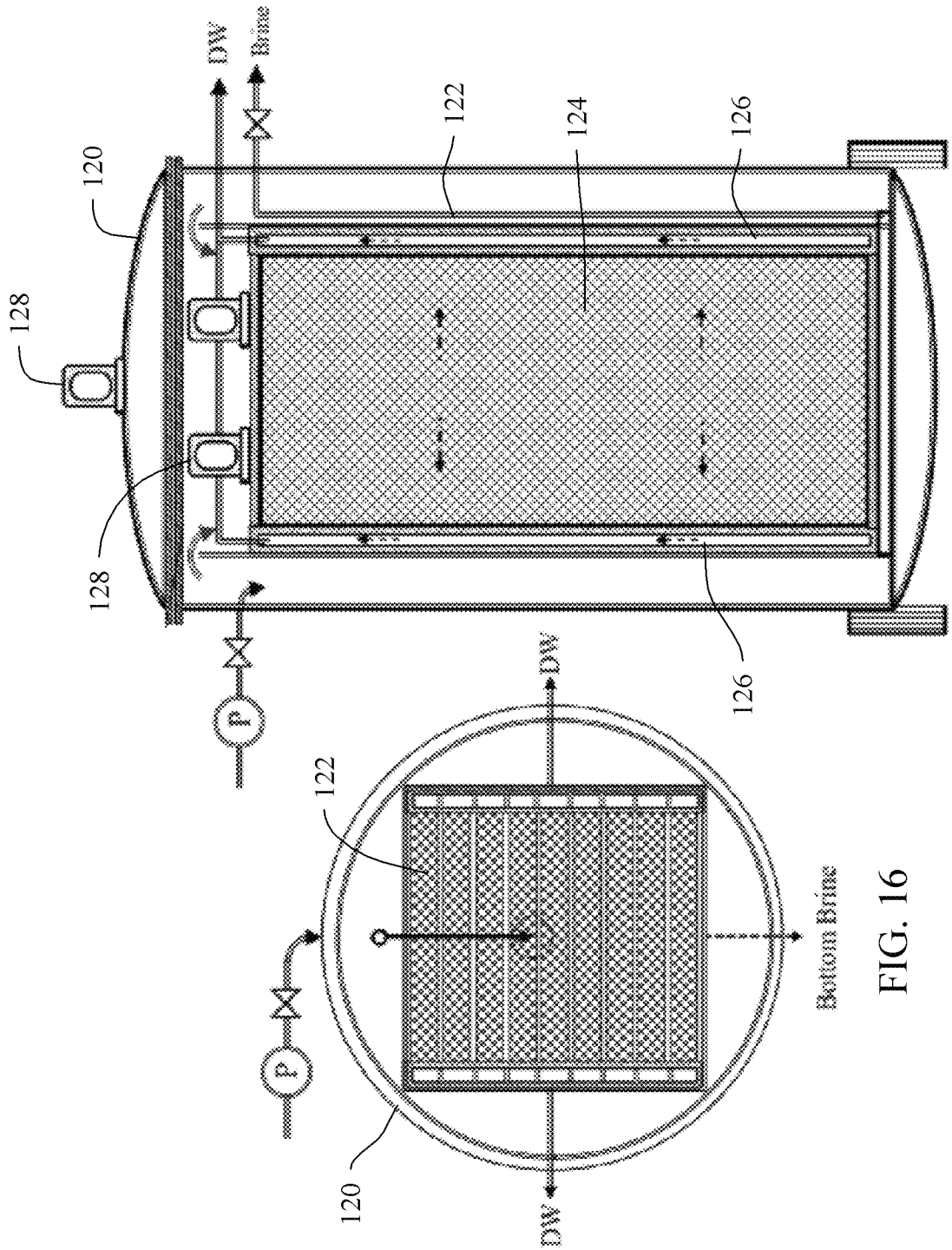
FIG. 16 is a cross-sectional top view of a vessel well RO with a Type 1 membrane of the present technology.
FIG. 17 is a cross-sectional view of an axial flow vertical well RO with a Type 1 flat membrane of the present technology.

Referring to FIGS. 16 and 17, an axial flow vertical well RO flat membrane Type 1 vessel well 114 for a RO Type 1 membrane 122 is illustrated and will be described. The vessel 114 is configured to receive an enclosure 122 featuring a closed end and an open end. The RO Type 1 membrane 124 is received in the enclosure 122, and it includes one or more RO panels and headers 126, as described above. Ultra-filtered saline water is pumped (P) into an annulus of the vessel 114 to the fill the vessel. Saline water will spill over a top edge of the enclosure 122 thereby entering the RO membrane 124. Desalinated water exits the RO membrane 124 via the headers 126, and then exits the vessel 120. Brine exits from the bottom of the RO membrane 124, and then exits the vessel. Lifting lugs 128 can be utilized with the frame of the RO membrane 124 and/or the vessel 120. It can be appreciated that this can be a single stage filtration and desalination tower or vertical well, utilizing axial flow (FSM) applicable for micro, ultra and nano filtration or RO Type 1 and 2 membrane process. Vessels can be stationary or trailer mounted.

Figure 18:
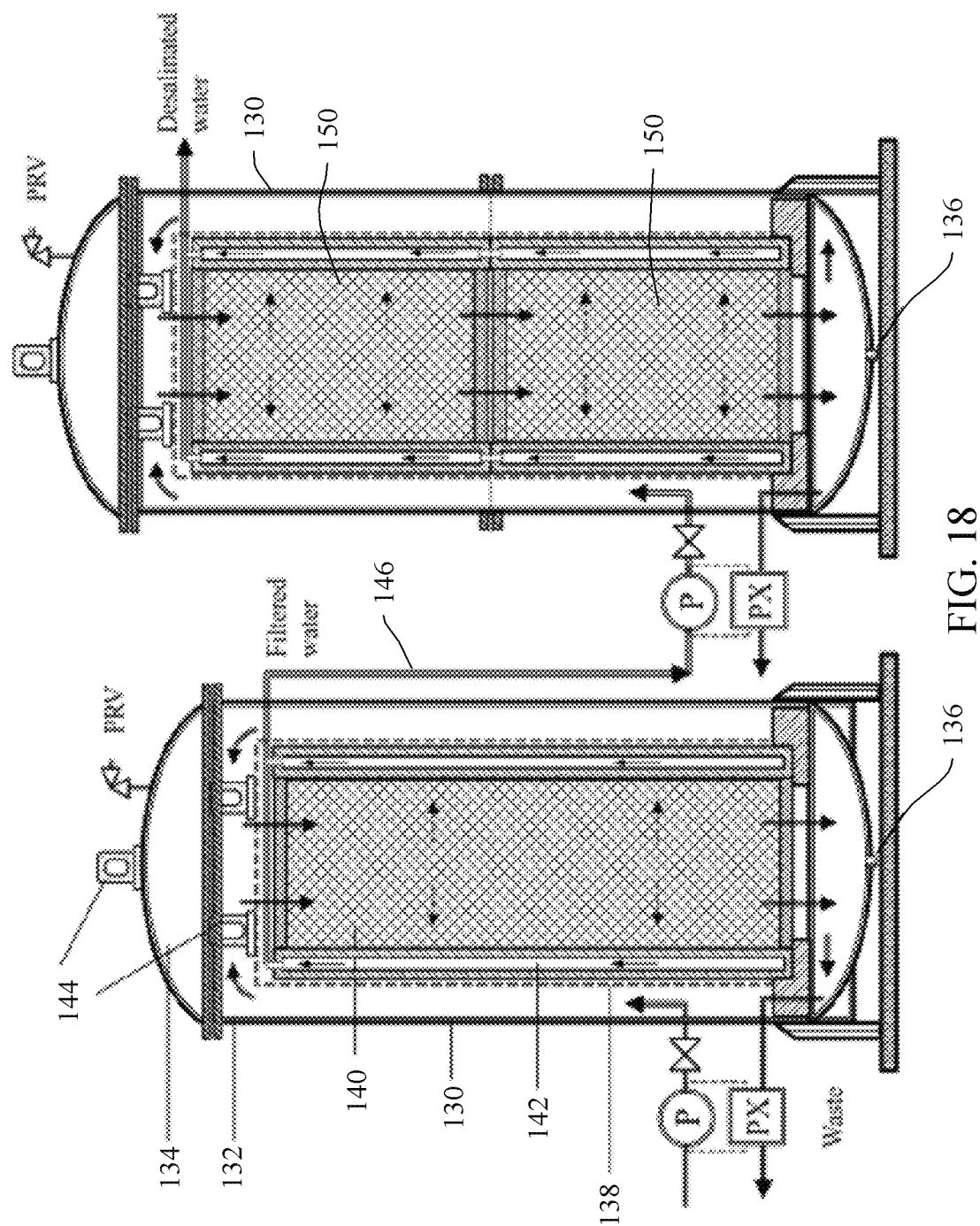
FIG. 18 is a cross-sectional view of a single or multiple stages for filtration and desalination towers or vertical wells of the present technology.

FIG. 18 represents a single or multiple stages for filtration and desalination towers or vertical wells. Axial flow applicable design for macro, micro, ultra and Nano-filtration, as well as present technology osmotic power generation and salinity reverse osmosis employing Type 1, 2 and 3 membrane processes.

A pressure vessel 130 includes a top retention plate 132, a vessel head 134 (in closed position) covering an open top end of the vessel, and a bottom end drain 136. The vessel 130 can be a polymeric carbon fiber reinforced vessel or equivalent. The vessel head 134 can include a pressure regulating valve (PRV). A flat sheet membrane (FSM) 140 is received in an enclosure or cage 138, which is receivable in the vessel 130. The enclosure 138 and/or the FSM 140 can be supported by a resting mount located adjacent and above the drain 136. The FSM 140 includes a frame and headers 142, as described above. Lifting lugs 144 can be utilized with the enclosure 138, a frame of the RO membrane 140 and/or the vessel head 134.

Filtered saline water is supplied to an annulus of the vessel 130 via a pump (P) and valve. The saline water fills the vessel 130 and spills over the enclosure 138 and enters into the FSM 140 to be processed as describe above. Filtered water exits the FSM 140 via the headers 142 and then exits the vessel via line 146. Brine exits from the bottom of the FSM 140, and then exits the vessel 130 via a pressure exchanger (PX) as waste. The pump (P) is associated with the pressure exchanger. Brine can further be drained using the drain 136.

Filtered water exiting the vessel 130 via line 146 is pumped into a second vessel 130, of similar configuration to the preceding vessel. The second vessel 130 includes a multi-stage FSM 150. The filtered water enters and second vessel and is processed in a similar manner to that of the preceding vessel and multi-stage FSM 150. Desalinated water exits the multi-stage FSM 150, while brine exits from the bottom of the multi-stage FSM 150, and then exits the second vessel 130 via a pressure exchanger (PX) as waste. The pump (P) of line 146 is associated with a pressure exchanger (PX). Brine can further be drained from the second vessel using the drain 136.

Figure 20:
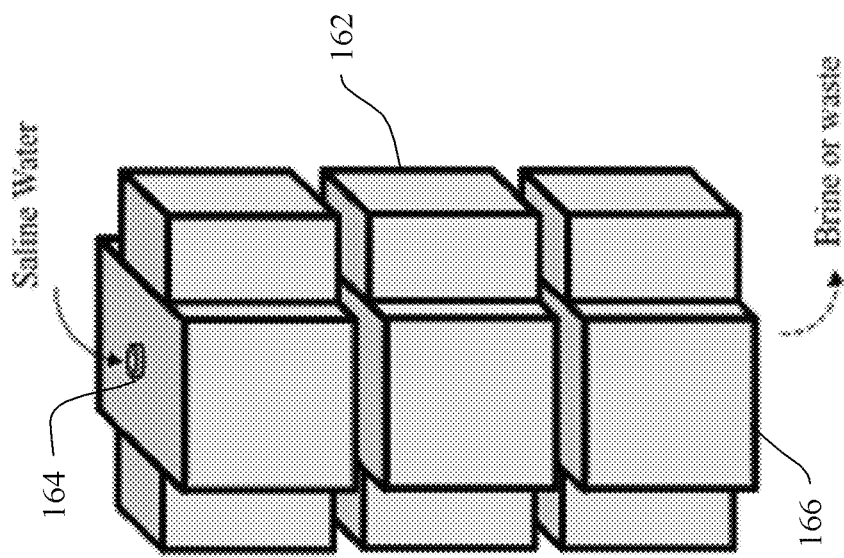
FIG. 20 is a perspective view of an enclosure for the multi-compartmented Type 2 membrane frame assembly of FIG. 19.
Figure 19:
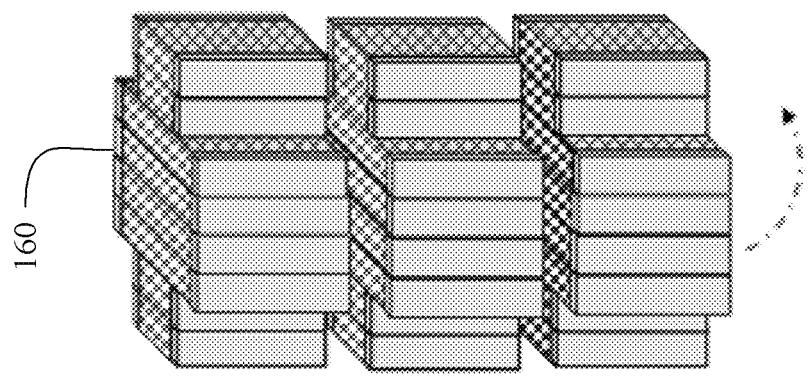
FIG. 19 is a perspective view of a multi-compartmented Type 2 membrane frame assembly of the present technology.

Referring to FIGS. 19 and 20, a multi-compartments Type 2 membrane frames and enclosure assembly is illustrated and described. A frame assembly 160 can be utilized for the Type 2 membrane, wherein multiple Type 2 membranes can be utilized in sequence, as best illustrated in FIG. 19. An enclosure or cage 162 can be used to enclose the multiple Type 2 membrane frame assemblies 160, as best illustrated in FIG. 20. The enclosure 162 can include a saline water inlet 164, and a brine or waster outlet 166.

Figure 22:
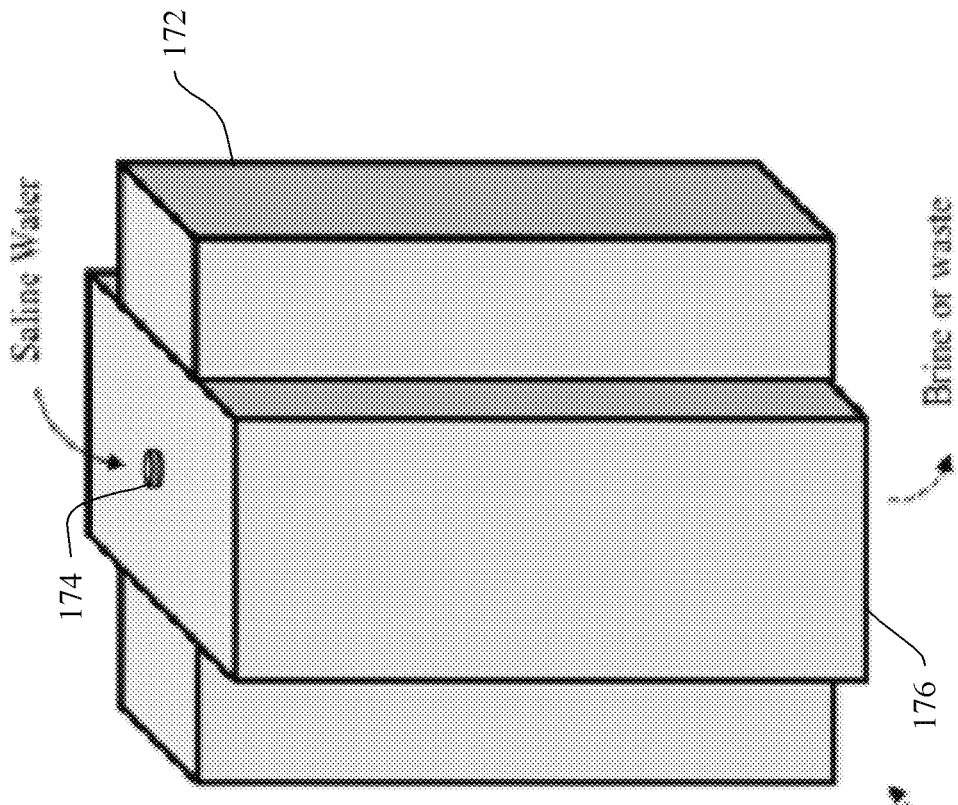
FIG. 22 is a perspective view of an enclosure for the multi-compartmented Type 2 membrane frame assembly of FIG. 21.
Figure 21:
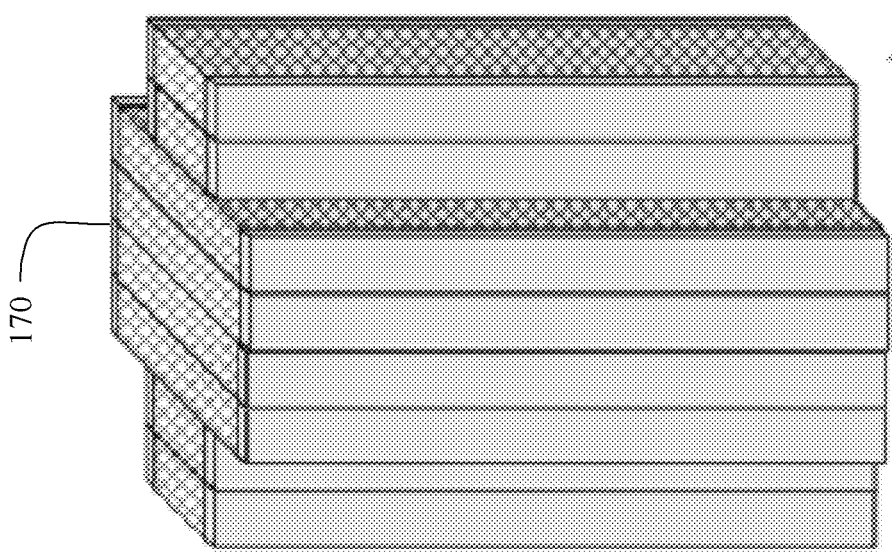
FIG. 21 is a perspective view of a Type 2 membrane frame of the present technology assembly for desalination fluids of a single solute.

Referring to FIGS. 21 and 22, a single compartment Type 2 membrane frames and enclosure assembly preferably for desalination fluids of a primarily a single solute/seawater, is illustrated and described. A frame assembly 170 can be utilized for a single Type 2 membrane, as best illustrated in FIG. 19. An enclosure or cage 172 can be used to enclose the single Type 2 membrane frame assembly 170, as best illustrated in FIG. 22. The enclosure 172 can include a saline water inlet 174, and a brine or waster outlet 176.

Figure 23:
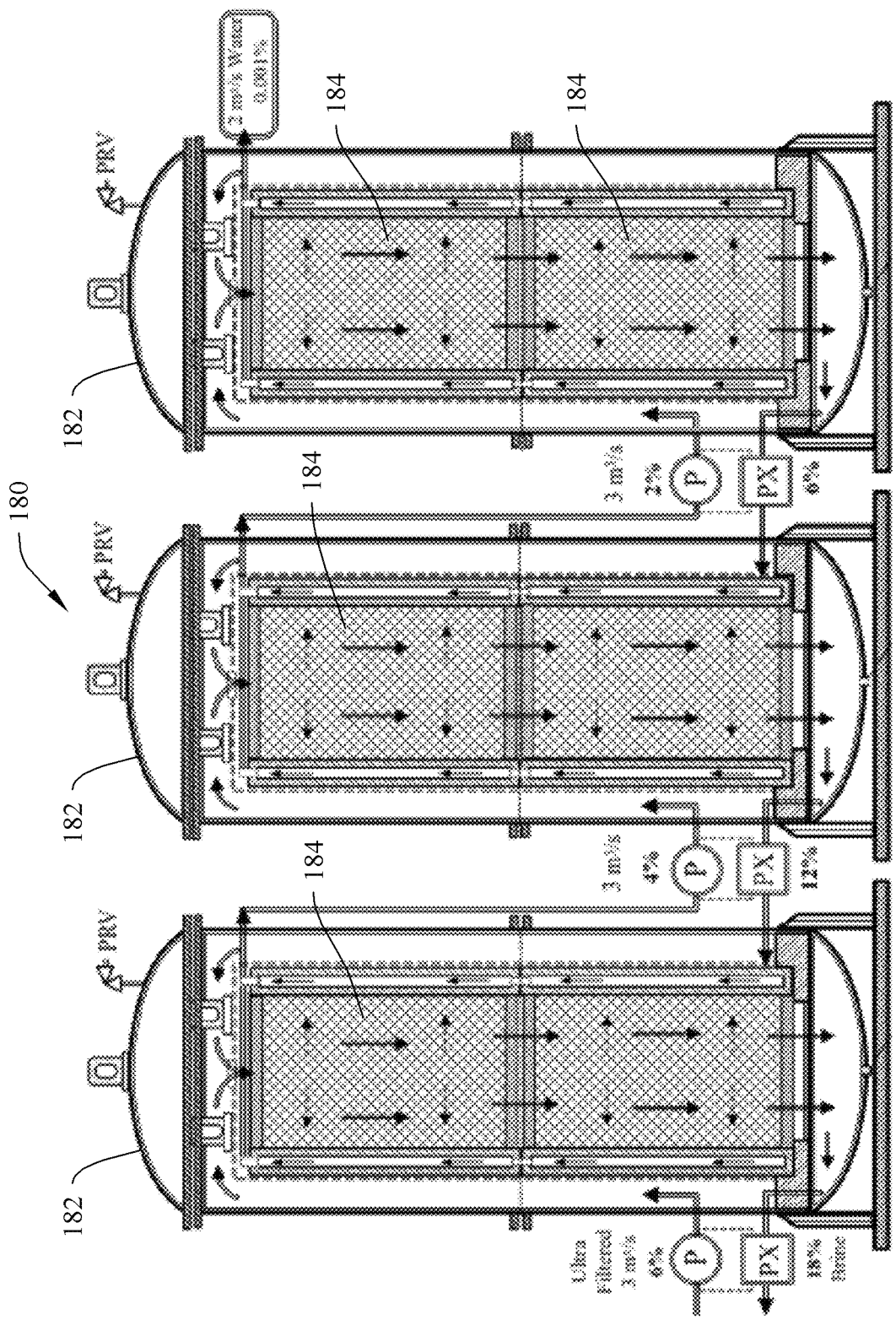
FIG. 23 is a cross-sectional view of an operating train utilizing multiple sequential hypersalinity RO flat sheet membrane towers of the present technology.

FIG. 23 represents an operating train 180. Generally, a train 180 comprises 2-5 sequential hypersalinity reverse osmosis flat sheet membrane towers (HRO-FSM) 182, which can be incorporated for various brine desalination applications. It can be appreciated that these vessels are ideally mounted outdoor, in groups of 3-5 vessels, depending on the nature and the operating salinity of the process fluids, such as but not limited to, brackish water, seawater, brine or mixed solutions, etc. The towers 182 can include a vessel and multi-stage FSM 184 similar to that illustrated in FIG. 18.

Ultra-filtered saline water can enter the first tower 182 at 6% salinity, and is processed through the first tower to produce filtered water at 4% salinity. The 4% filtered water exits the first tower and is pumped (P) into a second tower 182, where it is processed to produce filtered water at 2% salinity. The 2% filtered water exits the second tower and is pumped (P) into a third tower 182, where it is processed to produce filtered water at 0.001% salinity.

Brine exits from the bottom of the multi-stage FSM in the third or final tower 182, and then exits the third tower via a third pressure exchanger (PX) at 6% salinity. The 6% brine then enters the second tower and is further processed by the multi-stage FSM in the second tower 182. Brine exits from the bottom of the multi-stage FSM in the second tower 182, and then exits the second tower via a second pressure exchanger (PX) at 12% salinity. The 12% brine then enters the first tower and is further processed by the multi-stage FSM in the first tower 182. Brine exits from the bottom of the multi-stage FSM in the first tower 182, and then exits the first tower via a first pressure exchanger (PX) at 18% salinity. It can be appreciated multiple towers 182 can be utilized in this train, instead of the three towers illustrated.

Figure 24:
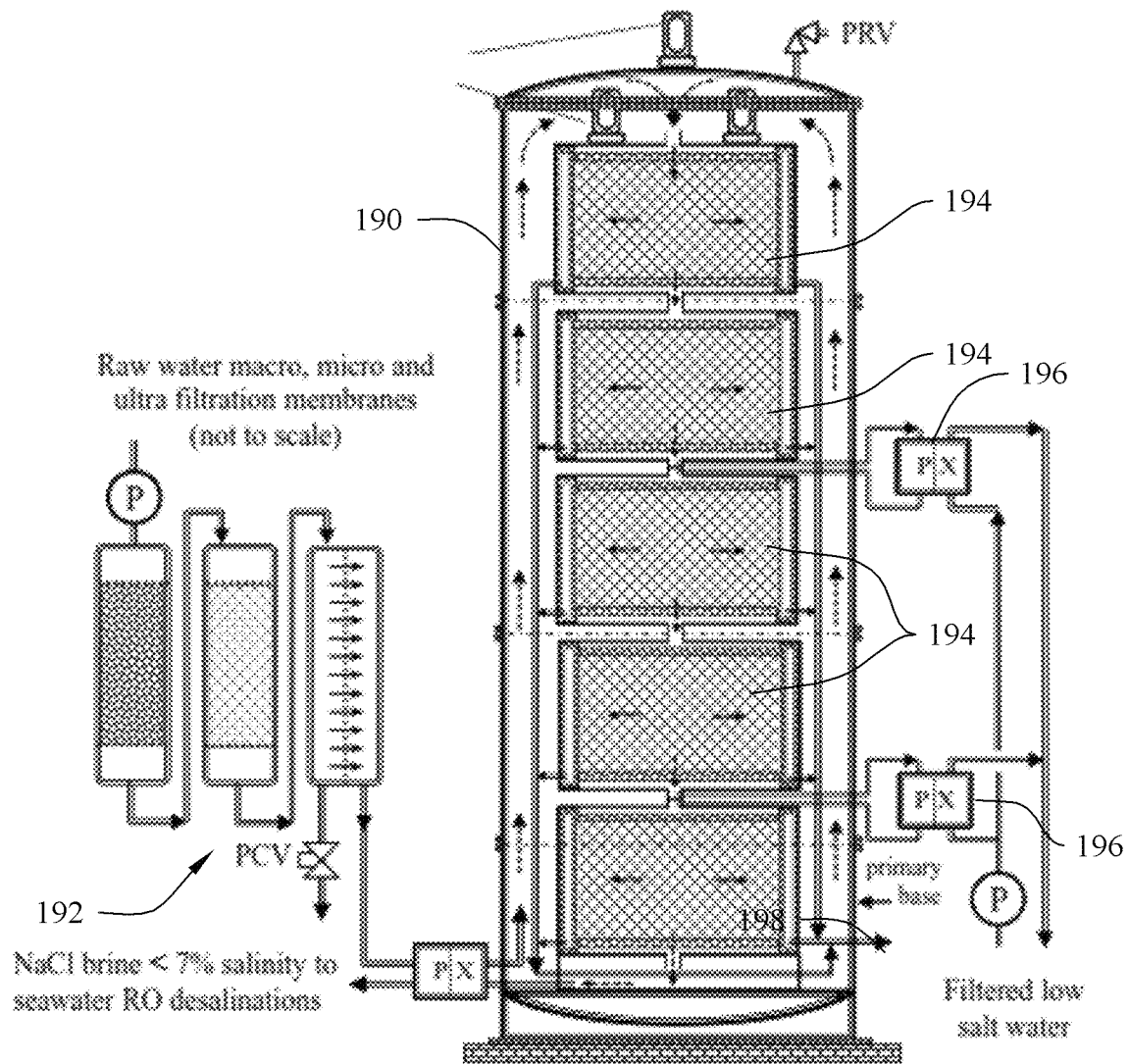
FIG. 24 is a cross-sectional view of a multi-staged RO axial flow brackish water desalination tower of the present technology for about 85% recovery

FIG. 24 represents a multi-stages FSM reverse osmosis axial flow brackish water desalination tower 190 with escalating pumping pressure to overcome salinity osmotic pressure rise. Raw water is pumped through a macro, micro and ultra-filtration membranes 192, and then passed through a pressure exchanger (PX), before entering the tower 190.

The tower 190 includes multiple stages of FSM 194 connected in series, with a top FSM receiving the filtered raw water. The filtered raw water is sequentially processed through each FSM stage 194. A pressure exchanger (PX) or circulating pump 196 can be utilized between FSM stages to increase pumping pressure for overcoming salinity osmotic pressure rise. Additional pressure exchanger may be incorporated on each stage to sustain a desired Reynold Number.

Filtered or desalinated water exits the headers from each of the FSM stages 194 and is discharged 198 from the tower 190. Brine exits from each FSM stage 194 and is either used an input for the next FSM stage or is passed through the pressure exchanger (PX) or circulating pump 196, which is then inputted into the next FSM stage. NaCl brine at less than 7% salinity is discharged from the final FSM stage through the pressure exchanger (PX) associated with the filtration membranes 192. The NaCl brine exiting the tower 190 can be passed to seawater RO desalinations.

Figure 25:
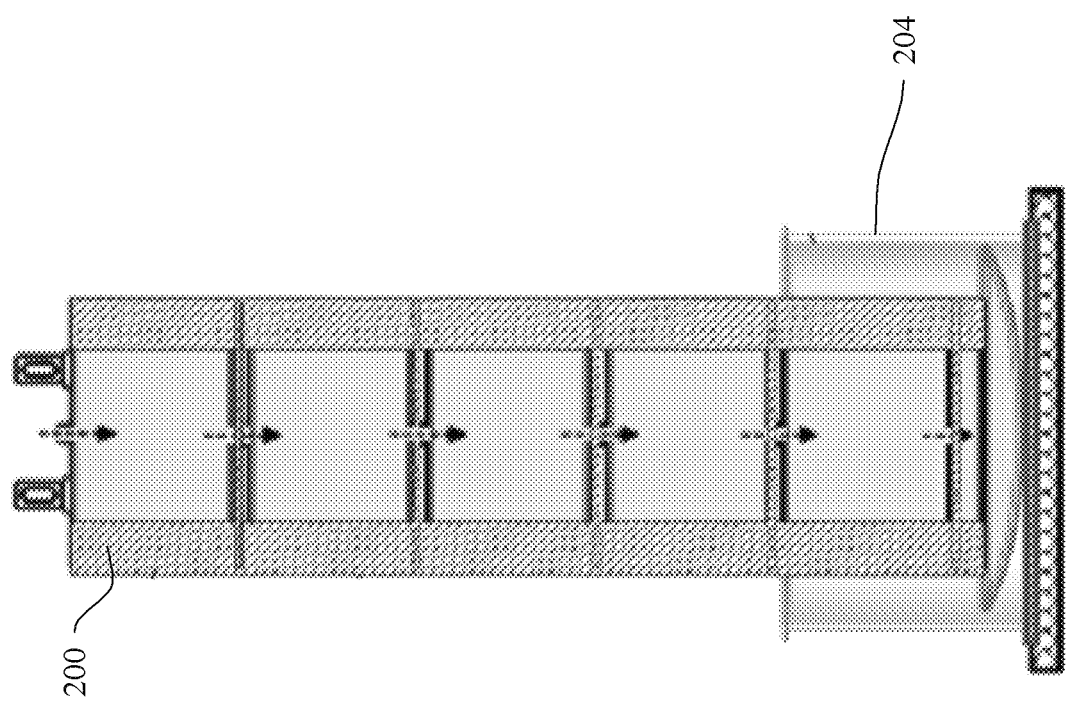
FIG. 25 is a cross-sectional view of a flat sheet membrane vessel utilizing a segmented slip-on pressure vessel shell of the present technology.
Figure 25:
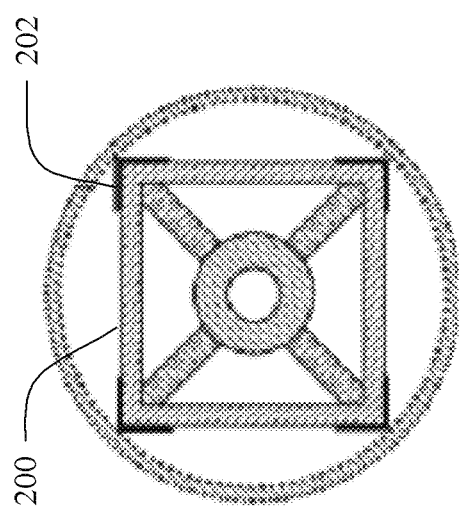
Figure 26:
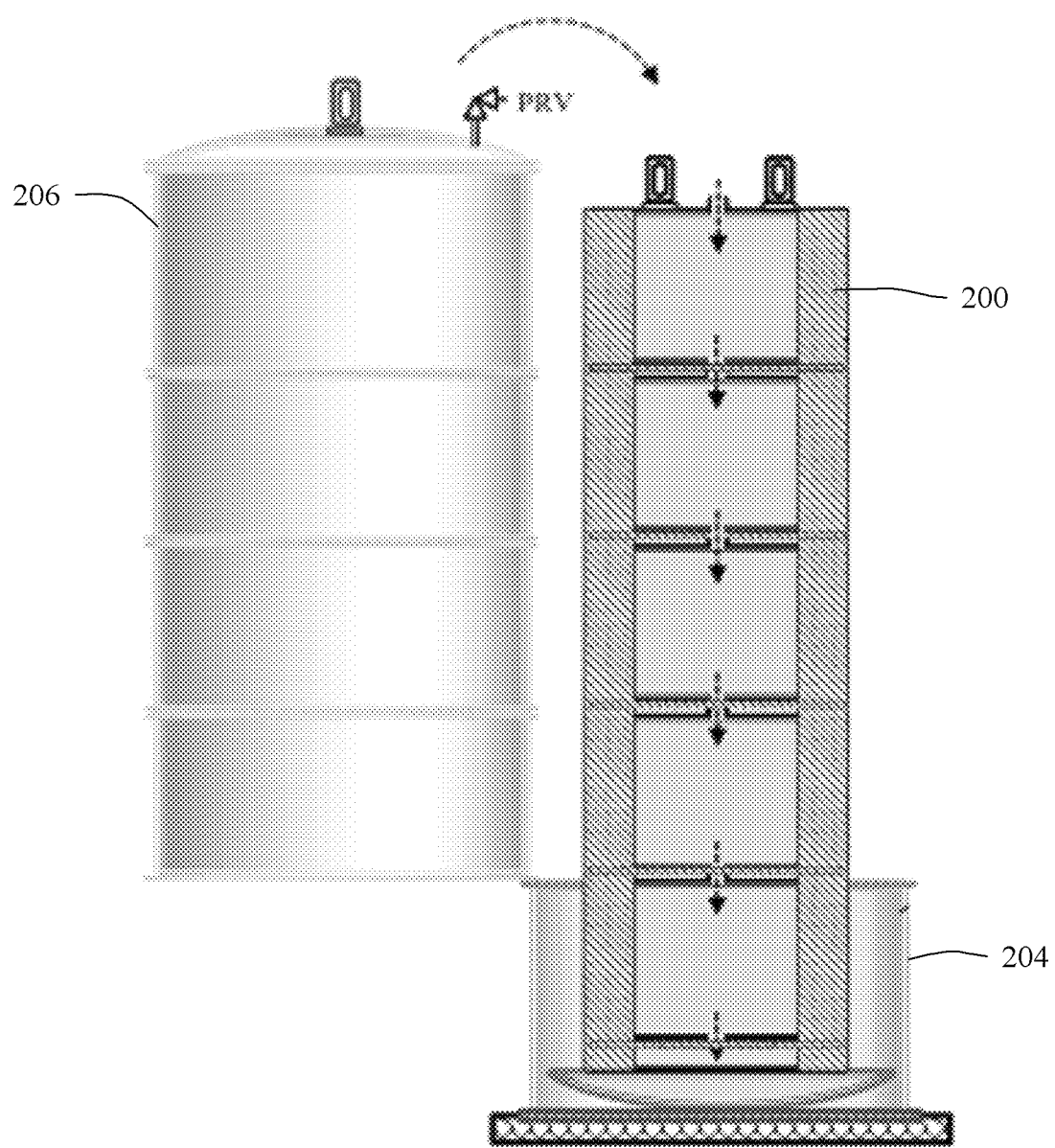
FIG. 26 is a side view of the segmented slip-on pressure vessel shell exploded from the flat sheet membrane vessel of FIG. 25.
Figure 27:
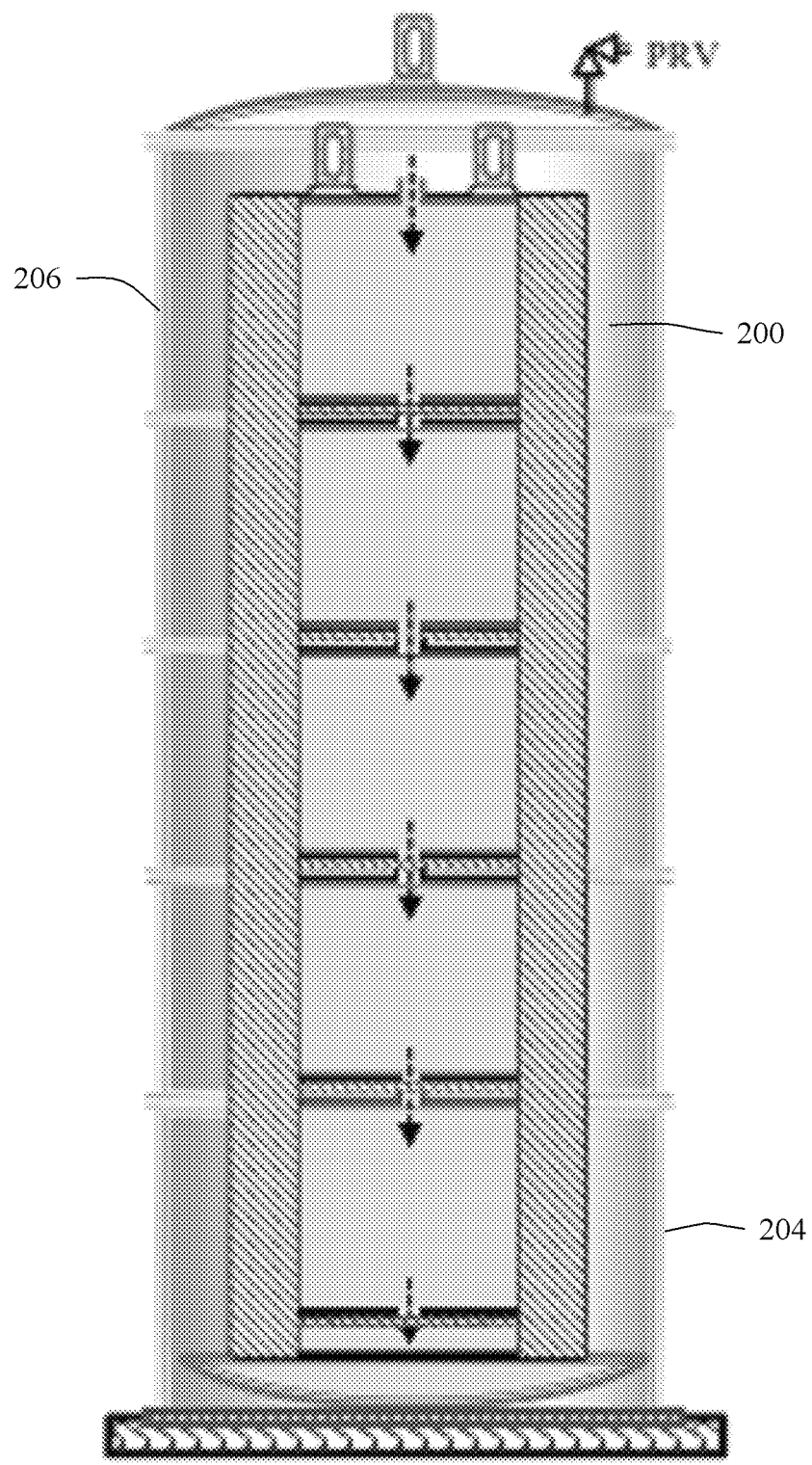
FIG. 27 is a cross-sectional view of a simplified vertical tower flat sheet membrane seawater desalination plant for large seawater desalination plants of the present technology.

FIGS. 25-27 represent a FSM vessel with a segmented slip-on pressure vessel shell, and illustrate an assembly of process and structural sections. Flat sheet membranes 200 can include compartment angular alignment structures 202 located a corners of the FSM 200, as best illustrated in FIG. 25, which includes cross-section of one of the FSM 200. Multiple FSM's 200 can be stacked one on top of the other and enclosed by the slip-on vessel shell. The slip-on vessel shell includes a vessel's primary equipment base segment 204, comprising all required connections and operation controls, internal piping not shown.

A segmented slip-on pressure vessel shell 206 can be positioned over the stacked FSM 200 so at to abut or rest on the base segment 204, as best illustrated in FIG. 26. The shell 206 can include lifting lugs.

With the shell 206 placed in position over the stacked FSM 200 and secured to the base segment 204, as best illustrated in FIG. 27, completion of the tower is complete for use with large seawater desalination plants operating a flows, such as but not limited to, 1-10 m³/sec.

Hydraulic fracking is a known method in hydrocarbon recovery. An assessment conducted by the Environmental Protection Agency (EPA) study of hydraulic fracturing for oil and gas and its potential impact on drinking water resources highlights the following five (5) activities that involve the water cycle in the hydraulic fracturing process. These are:

Water acquisition: the withdrawal of ground or surface water needed for hydraulic fracturing fluids;

Chemical mixing: the mixing of water, chemicals, and proppant on the well pad to create the hydraulic fracturing fluid;

Well injection: the injection of hydraulic fracturing fluids into the well to fracture the geologic formation;

Flowback and produced water: the return of injected fluid and water produced from the formation (collectively referred to as produced water in this report) to the surface, and subsequent transport for reuse, treatment, or disposal; and Wastewater treatment and waste disposal: the reuse, treatment and release, or disposal of wastewater generated at the well pad, including produced water.

The present technology in part addresses two ignored topics by the EPA, which are flowback and produced water, and wastewater treatment and waste disposal. Further, the present technology covers evaluation and proposal for mitigation of atmospheric emissions, radiation, water resources and others.

These two ignored sections from EPA proposal are the core of the present technology development for a comprehensive technology to sustain biological life forms and safeguard the environment. This effort is taking, also, into consideration the effect of naturally occurring radioactive materials deposits that is becoming a subject of governmental concern. As well as prompting the Environmental Protection Agency, EPA, to take a vital role in the matter.

Approximately 10-25 percent of the water injected into the well is recovered within three to four weeks after drilling and fracturing a well. Returned wastewater that is recovered during the drilling process (drilling water), returned to the surface after hydraulic fracturing (flowback water), or stripped from the gas during the production phase of well operation (produced water) must be disposed of properly.

This recovered wastewater contains numerous pollutants such as barium, strontium, oil and grease, soluble organics, and a high concentration of chlorides. The contents of the wastewater can vary depending on geological conditions and the types of chemicals used in the injected fracturing fluid.

These wastewaters are not well suited for disposal in standard sewage treatment plants. Recovered waters can adversely affect the biological processes of the treatment plant, impacting the bacteria critical to digestion) and leave chemical residues in the sewage sludge and the discharge water.

Radionuclides, particularly radium 226, are serious flowback and produced water contaminants. Efficiency of radionuclides removal from drinking water depends on the contaminant's chemical and physical characteristics. Currently, if radionuclides are present in water, co-precipitation with barium sulfate, greensand filtration, ion exchange, lime softening, manganese oxide filtration, and reverse osmosis are used. However, disposing of the precipitated radionuclides is a matter of concern.

Figure 34:
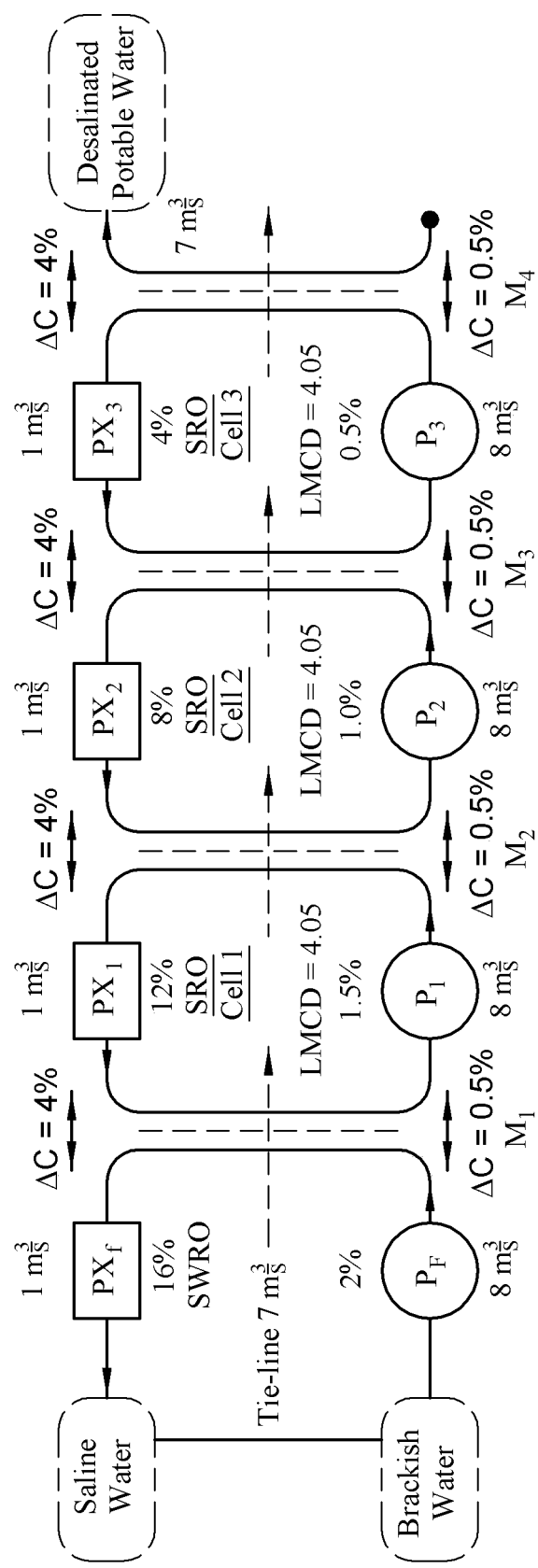
FIG. 34 is a diagram of a symbiotic reverse osmosis train of the present technology at constant differential salinity concentration of 4%.

Current practice for recovering water from hydraulic fracturing flowback is illustrated in FIG. 34. Flowback is murky, salty water. It consists of fracturing fluid, which returns to the surface as well as produced water. This water contains clay, dirt, metals, chemicals and even diesel that may have been added. Flowback is about 15-40% percent of the volume of fluid that is injected. It flows back over few days and up to a period of 3-4 weeks. More than half of the injected fluid remains in the formation.

The retuning fluid is generally collected in metal tanks or else open pools, lagoons or pits lined with one or more layers of plastic. These are then pumped dry, and water is usually either recycled for fracturing additional wells or else trucked off site to a waste water disposal facility.

About 60% of flowback water is reused before it is released back into the environment, particularly when multiple wells are in close proximity and the mount of iron in the water, suspended solids, bacteria and other contaminants are manageable.

According to the International Petroleum Industry Environmental Conservation Association (IPIECA), well completion refers to the process that initiates the flow of petroleum or natural gas from a newly drilled well prior to production.

Well completions that involve hydraulic fracturing result in a higher rate of flowback than most conventional well completions, due to the massive quantities of water and proppant (mainly sand) used to fracture lower permeability reservoirs.

This high-rate flowback is generally composed of a mixture of fracking fluids with reservoir gas and liquids. For most wells, it takes from one day to several weeks to perform a well completion, during which the flowback mixture is typically released to an open pit or tank where the gas released from the liquids is vented to the atmosphere or flared depending on regulatory requirements or other factors.

If the gas is vented, this may generate a significant amount of methane and hydrocarbon emissions to the atmosphere. Similarly, flaring generates a significant amount of combustion emissions, incurs product losses and is not always a viable option depending on the well location, the concentration of flammable gases in the flowback gas and other considerations.

To offset the loss of methane and other hydrocarbons during flowback, a technology known as Reduced Emissions Completions (RECs) or "Green Completions" may be implemented, comprising a temporary system consists of a skid or trailer mounted set of a plug catcher, a sand trap and a three-phase separator to remove any large solids, water, hydrocarbon condensate and recovering the gas.

Conversely, carbon dioxide is gaining acceptance for use as a pH control in water treatment plant.

The addition of carbon dioxide is preferred over the addition of sulfuric acid because it is less hazardous to use. Carbon dioxide reduces high pH levels quickly.

It was found that carbon dioxide gives better control of pH than sulfuric acid. It shows a self-buffering as it reaches neutral pH levels.

Carbon dioxide dissolves in water forming a weak carbonic acid according to the following reaction:

$$CO_2 + H_2O \rightarrow H_2CO_3$$

Carbonic acid is then ionized into $HCO_3$-species. The ionization constant for this reaction is $4.31 \times 10^{-7}$ at 25° C. The pH value is reduced to about 6.0 by dissolving carbon dioxide. Evolution of carbon dioxide from water leads an increase in the pH value according to the reverse of the net reaction of the preceding two reactions:

$$H_2CO_3 \rightarrow H^+ + HCO_3^-$$

$$CO_2 + H_2O \rightarrow H^+ + HCO_3^-$$

The decrease in the carbon dioxide concentration in water is due to the conversion of bicarbonate into carbonate. Carbon dioxide at concentrations of about 100 ppm or more increases water corrosivity significantly, particularly if of traces amount of oxygen are released.

In the exemplary, typical chemical analysis of hydraulic fracturing produced water in three largest sites in United States, is illustrated in Table 1.

TABLE 1

The mix of fracking fluid and groundwater known as produced water contains wide variations in water chemistry

SHALE FORMATION

| Content (MG/L) | Barnett (Texas) | Haynesville (Ark., LA., Texas) | Marcellus (N.Y., PA., W.VA.) |
|---|---|---|---|
| TDS | 40,000-185,000 | 40,000-205,000 | 45,000-185,000 |
| CL- | 25,000-110,000 | 20,000-105,000 | 25,000-105,000 |
| NA+ | 10,000-47,000 | 15,000-55,000 | 10,000-45,000 |
| $Ca^{2+}$ | 2,200-20,000 | 3,100-34,000 | 5,000-25,000 |
| $Sr^{2+}$ | 350-3,000 | 10-3,000 | 500-3,000 |
| $Mg^{2+}$ | 200-3,000 | 600-5,200 | 50-6,000 |
| $Ba^{2+}$ | 30-500 | 100-2,200 | 50-6,000 |
| $Fe^{2+}/Fe^{3+}$ | 22-100 | 80-350 | 20-200 |
| $SO_4^{2-}$ | 15-200 | 100-400 | 10-400 |

TDS = total dissolved solids.
Source: GE Power & Water

Hydraulic fracture fluid components may include any of the following components:
  Acid—hydrochloric acid;
  Corrosion and Scale Inhibitors—alcohol, glycol, and amide;
  Iron Control—citric;
  Biocide—sodium salt, sodium hydroxide;
  Friction Reducer—water soluble polymer (nitrogenous);
  Breaker—sodium and potassium salts;
  Gel—guar gum, hydrocarbon, and polymer; and/or
  Surfactant—alcohol, glycol and hydrocarbon.

Radium in water exists primarily as a divalent ion (Ra2+) and has chemical properties that are similar to barium, calcium, and strontium. The solubility of radium salts in water generally increases with increased pH levels. The solubility of radium sulfate and carbonate are low; the solubility constants for crystalline $RaSO_4$ and $RaCO_3$ have been estimated as $5.495 \times 10^{-11}$ mole/L and $5.01 \times 10^{-9}$ mole/L, respectively. Radium nitrate, chloride, and iodate are very soluble in water.

However, the concentration of radium in water is usually controlled by adsorption-desorption reactions at solid-liquid interfaces which are in turn influenced by pH or by the dissolution and co-precipitation of minerals that contain radium.

Several types of technologies can be used such as co-precipitation with barium sulfate, greensand filtration, ion exchange, lime softening, preformed hydrous manganese oxide filtration, and reverse osmosis.

Ion exchange can be used in small systems. It removes 90% of the radionuclides it encounters. The water flow must be regularly monitored, and the resin must be regenerated frequently.

Lime softening can be used to remove radium. It has an efficiency of 80% to 95%. Adding lime to water increases its pH and can also be a method for treating hard water.

Reverse osmosis removes multiple radionuclides, including radium and uranium. It can achieve separation rate up to 98%.

Therefore, removal of radium elements, particularly radium [226] is an objective of the present technology, for recovering potable quality water from the flowback of the "Hydraulic Fracturing Operation".

In compliance with this set objective, several functions have to be taking into consideration, comprising most if not all the following areas:
  Factors Affecting Underground Water Quality:
    1. Free and dispersed oil and grease present in produced water, soluble insoluble organics, water hardness, organophosphorus, insecticides, nerve gases, herbicides, industrial chemicals.
2. Bacteria, microorganisms, algae, etc.
3. Pesticides,
4. Suspended solids removal,
5. Dissolved gas,
6. Dissolved salts, sulfates, nitrates, contaminants, scaling agents, etc.,
7. Metals,
8. Naturally occurring radioactive materials, particular Radium 226.

Current Disposal Means and Options:
1. Reinjection into producing well,
2. Evaporation in pits/ponds,
3. Permitted disposal wells,
4. Momentous trucking means.

Processes of Recovery:
1. Coagulation and filtration,
2. Scale problems in production,
3. Organics oxidation by electrocoagulation,
4. Radionuclide removal,
5. Water recovery,
6. Salt recovery, Currently, most commercial polymeric membranes are prepared by the phase inversion technique, and the performance of those membranes is known to be governed by their pore characteristics, which is influenced by the molecular characteristics of the polymer and methods of preparing said membrane. For example; Reverse Osmosis (RO, <1 nm), Dialysis (2-5 nm), Ultrafiltration (UF, 2-100 nm), and Microfiltration (MF, 100 nm to 2 µm).

Nanofiltration (NF) membranes are a relatively new membrane type and ranges in its pore sizes between the ranges of reverse osmosis membrane (RO) and ultrafilter membrane (UF). Operating pressure of membranes can reach several hundred pounds per square inch, as in the case of desalinating seawater. Generally, membrane characteristics is highly dependent on its intended service and the required operating pressure.

Recently, atomic force microscopy (AFM) is a three-dimensional topographic technique is being applied to membranes for biological and synthetic applications. AFM measures pore size and pore size distribution, surface pore density per unit area and the fraction of the porous surface.

Reverse osmosis (RO) membranes are well suited for desalination of moderate brines of law salt concentration (up to 35,000-45,000 mg/L, i.e. 3.5%-4.5% salt content) that is free of oil and other organics. Advances in membrane technology may improve RO performance, but at present, most Marcellus-derived produced waters cannot be treated through RO as TDS exceeds 40,000 mg/L.

Such conditions have prompted the present technology including a system and process to desalinate saline water with salinity exceeding 100,000 mg/L, i.e. 10% salt.

Figure 28:
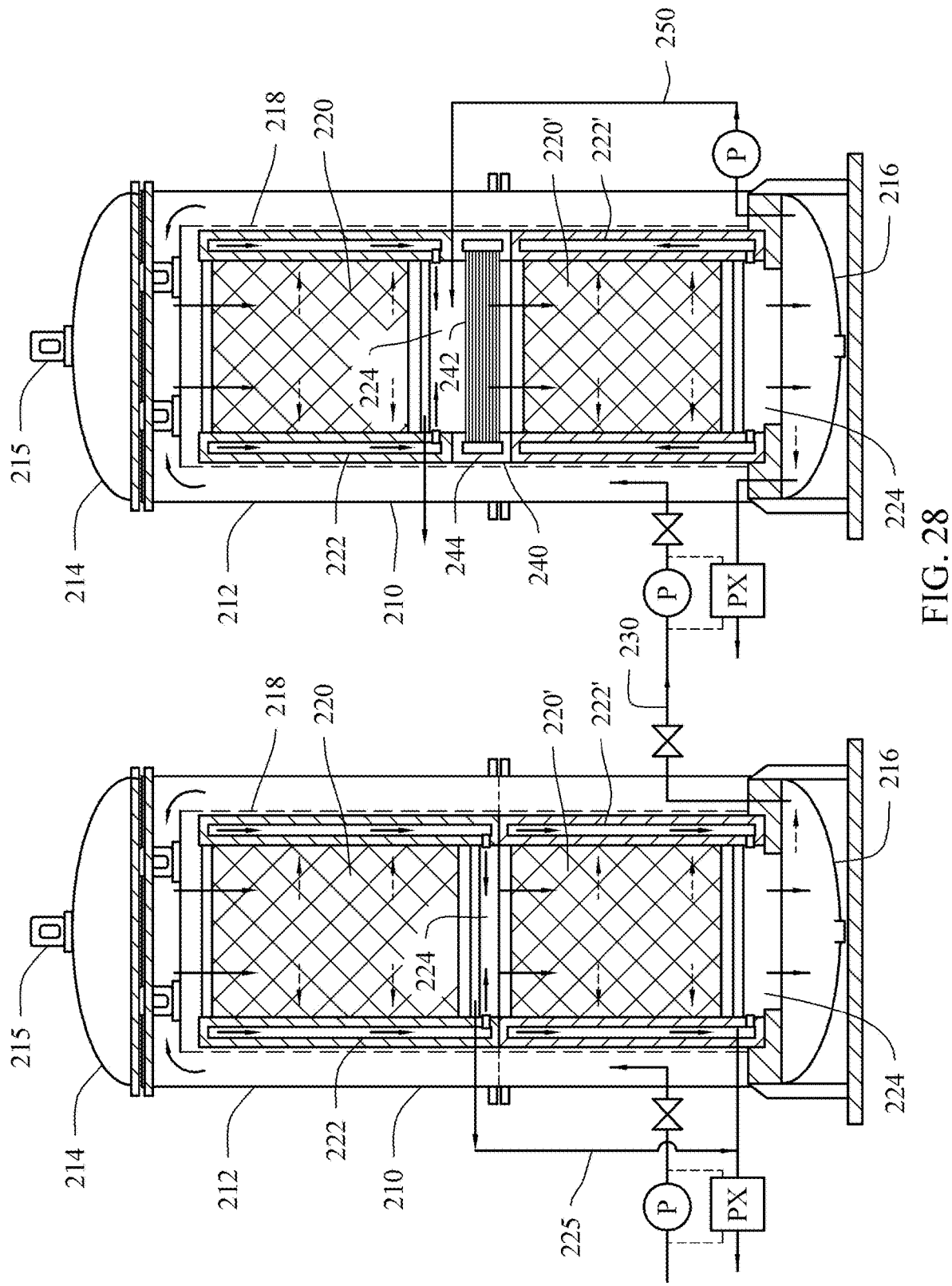
FIG. 28 is a cross-sectional view of a single or multiple stages for filtration and desalination towers or vertical wells of the present technology utilizing dual functions macro and micro filtration and dual steps agitated and temperature controlled nano filtration.

Referring to FIG. 28, embodiments of the present technology can include a multi-stage dual function macro and micro filtration utilizing dual steps agitated and temperature controlled nano-filtration. A first pressure vessel 210 includes a top retention plate 212, a vessel head 214 (in closed position) covering an open top end of the vessel, and a bottom end drain 216. The vessel 210 can be a polymeric carbon fiber reinforced vessel or equivalent. The vessel head 214 can include a pressure regulating valve (PRV).

A first stage micro-filtration flat sheet membrane (FSM) 220 and a second stage ultra-filtration FSM 220' are received in an enclosure or cage 218, which is receivable in the vessel 210. The enclosure 218 and/or the FSM 220, 220' can be supported by a resting mount located adjacent and above the drain 216. The FSM 220, 220' each include a frame and headers 222, respectively, as described above. Lifting lugs 215 can be utilized with the enclosure 218, a frame of the RO membrane 220 and/or the vessel head 214.

Filtered saline water is supplied to an annulus of the vessel 210 via a pump (P) and valve. The saline water fills the vessel 210 and spills over the enclosure 218 and enters into the first stage FSM 220 to be processed as describe above. Filtered water exits the first stage FSM 220 via the headers 222 and then enters a first space, cavity or chamber 224. Brine exits from the bottom of the first stage FSM 220, and then exits the vessel 210 via a pressure exchanger (PX) as waste. The pump (P) is associated with the pressure exchanger PX.

The filtered water from the first chamber 224, then enters into the second stage FSM 220' to be processed as describe above. Filtered water exits the $2^{nd}$ stage FSM 220' via the headers 222' and then enters a lower space, cavity or chamber 224. Brine exits from the bottom of the second stage FSM 220', and then exits the vessel 210 via the pressure exchanger (PX) as waste. Brine from the second stage FSM 220' can further be drained using a drain.

Filtered water exiting the first vessel 210 via line 230 and is pumped into a second vessel 210, of similar configuration to the preceding vessel. The second vessel 210 includes a first stage nano-filtration FSM 220 and a second stage nano-filtration FSM 220'. The filtered water enters the second vessel and is processed in a similar manner to that of the preceding vessel and multi-stage FSM 220, 220'.

Located in the first chamber 224 of the second vessel is an encloses water cooled heat exchanger 240, which includes laterally extending tubes 242 in communication with headers 244. The filtered water entering the first chamber 224 passes over and around the tubes 242 to transfer heat thereto or therefrom. The filter water then exits the tubes 242 and then enters into the second stage FSM 220' to be processed as describe above.

Desalinated water exits the second stage FSM 220' of the second vessel, while brine exits from the bottom of the first stage FSM 220, and can exit from the bottom end 216 of the second vessel 210 via a pressure exchanger (PX) as waste. The pump (P) of line 230 is associated with a pressure exchanger (PX). Brine can further be drained from the second vessel using the drain.

Brine from the second vessel can still further be pumped from the bottom end 216 via a line 250 and a pump (P). Line 250 can provide brine to the first chamber 224 at a location above the heat exchanger 240, so as to be mixed with the filtered water exiting the first stage FSM 220.

It can be appreciated that the multi-stage FSM system of FIG. 28 can configured as towers comprising up to 8 stages or more, reaching a height of 20 feet or more.

Figure 29:
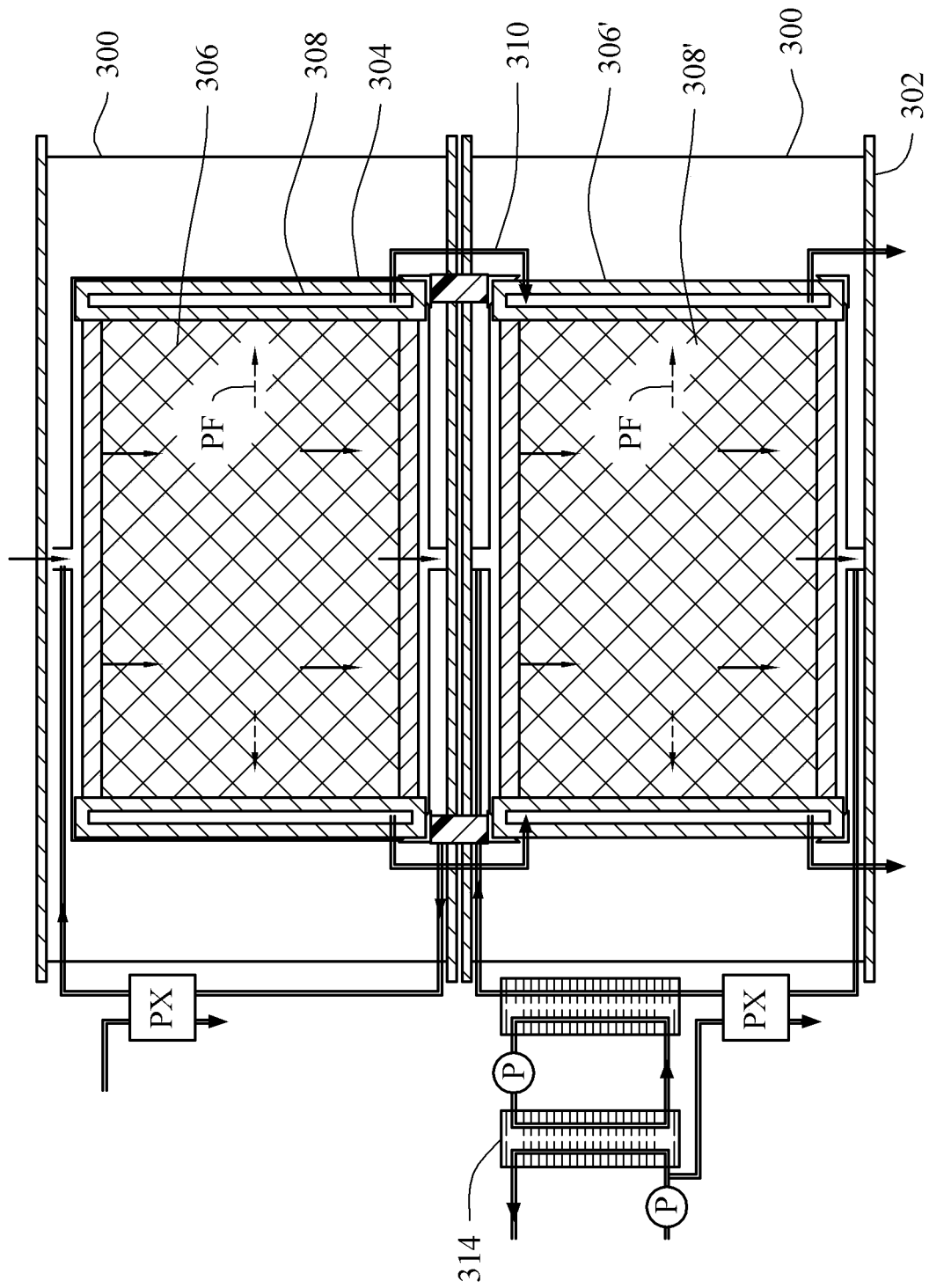
FIG. 29 is a cross-sectional view of a self-supported rectangular flat sheet membrane (FSM) compartment of the present technology.

Referring to FIG. 29, embodiments of the present technology can include a self-supported rectangular FSM compartment including vertical sections. A multi-stage pressure vessel is utilized, which includes multiple pressure vessel stages 300 each with pressure vessel flanges 302. A first vessel stage 300 receives a liquid flow where it enters a top of a first FSM enclosure 304. Located inside the first FSM enclosure 304 is a first FSM 306, which can be configured for different fluid treatment, such as but not limited to, macro, micro, ultra or nano filtration, or reverse osmosis desalination. The flow enters the first FSM 306 wherein it is treated and permeated water, which is now filtered or desalinated water, flows across PF the FSM panels and into a header 308.

Brine, semi-filtered or non-filtered water exits the FSM enclosure 304 and enters a second FSM enclosure 304 of a second vessel stage 300 to be processed as described above. The first and second vessel stages 300 are separated by separation blocks 312.

The brine, semi-filtered or non-filtered water from the first chamber 224 then enters into the second stage FSM 220' to be processed as describe above. Brine, semi-filtered or non-filtered water enters a top of a second FSM enclosure 304', which includes a second FSM 306'. The flow enters the second FSM 306' wherein it is treated and permeated water flows across PM the FSM panels and into a header 308'. It can be appreciated that the first and second FSM enclosures 304, 304' can be made of a metallic or polymeric material.

The permeated water from the header 308 of the first FSM 306 is in communication with the header 308' of the second FSM 306' via lines 310.

The first and second vessel stages 300 each comprises a pressure exchanger PX for insuring flow turbulence based on Reynolds Number of 3000-3,500. The second vessel stage 300 can include a water chiller 314 associated with the pressure exchanger PX of the second vessel stage for adjusting membrane flow temperature to control ultra and nano membrane pore size for efficient separation of dissolved salts of specific molecular diameter. The water chiller 314 can operate around 5°-20° C. for membrane pore size adjustment. The water chiller 314 can include a dual chilling chambers with a closed circulation loop therebetween.

Figure 30:
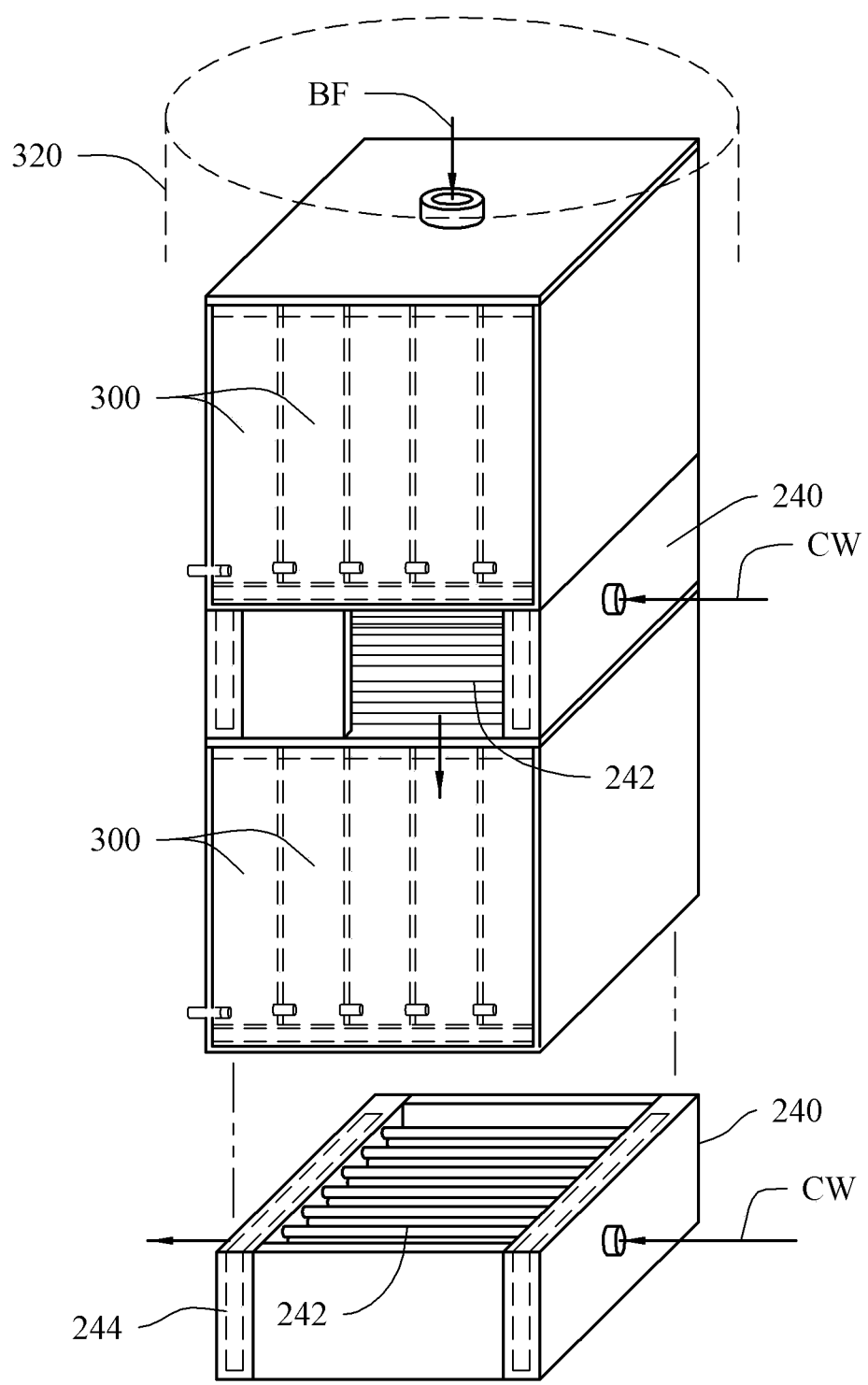

Referring to FIG. 30, embodiments of the present technology can include RO ultra or nano FSM mounted on brine water cooler for adjusting membrane pore size in stages. Multiple FSM housing compartments 300 can be sequentially utilized with adjacent compartments in communication to receive the permeated flow. A brine flow BF enters the pressure vessel 320 that encloses all the stages of compartments and the heat exchangers 240. The brine flow passes through each of the compartments 300 and is processed as described above. It can be appreciated that multiple stages or trains FSM compartments 300 and heat exchangers 240 can be utilized.

The brine flow exits the multiple stages of FSM compartments 300 and then passes through the heat exchanger 240, where it is cooled. The heat exchanger 240 receives cooling fluid/water CW to cool down the passing brine flow.

The cooled brine flow exits the heat exchanger 240 to enter a sequential multiple FSM compartment 300 assembly, with the cooled brine flow being processed as described above.

Referring to FIGS. 31-33, the heat exchanger 240 is illustrated and will be described. The heat exchanger 240 includes an exchanger compartment enclosure that supports the tubes 242 and header 244. Cooling water CW enters an inlet at one location of the tube 242 or header 244, travels along a tube path, and then returns to an outlet located on the same location of the inlet. An open space is defined between the tubes to allow fluid flow therebetween and through the heat exchanger 240.

Referring to FIG. 34, embodiments of the present technology can include a symbiotic reverse osmosis (SRO) train. In the exemplary, a tri-Cell SRO can be utilized with 2% brackish water @ 87.5% recovery, at constant differential salinity concentration of 4% (OS-P=448 PSI).

The SRO train pumps $P_F$ brackish throw an initial seawater reverse osmosis (SWRO) system utilizing a pressure exchanger, hydraulic turbine, relieve valve $PX_f$. Saline water exits the pressure exchanger $PX_f$. The SRO train can utilize multiple SRO cells (cell 1-n) having a Log Mean Concentration Difference (LMCD) of 4.05. The final SRO cell producing desalinated potable water.

Figure 35:
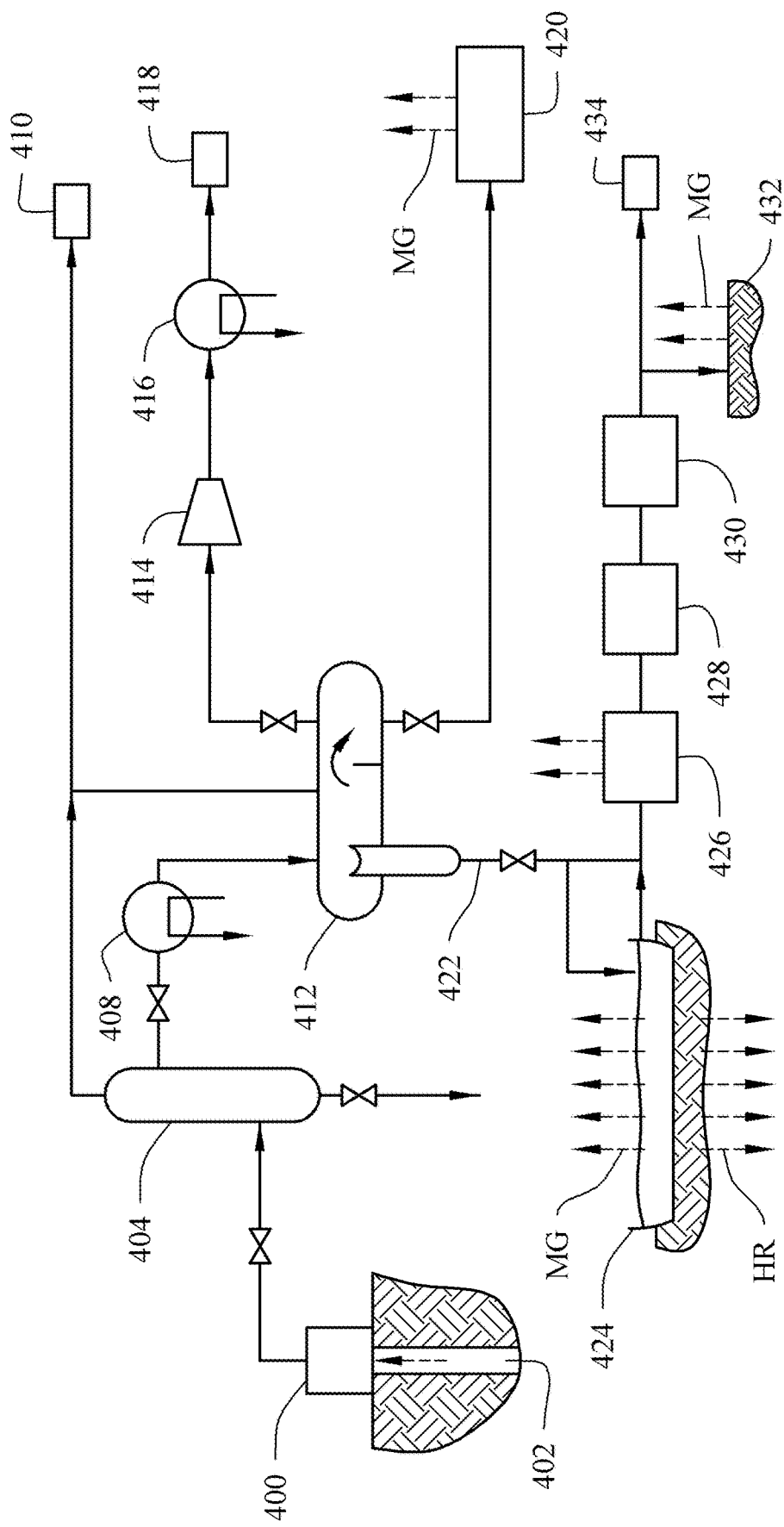
FIG. 35 is a schematic view of prior art EPA conventional hydraulic fracturing process.

In the exemplary, FIG. 35 schematically illustrates an Environmental Protection Agency (EPA) conventional hydraulic fracturing process, which includes a wellhead 400 that receives flowback and/or produced water 402 from a subterranean hydraulic fracturing process. The produced water can pass through a sediment/sand separator 404 that separates sand from the produced water utilizing a sand trap 406. Flammable gases can escape the separator 404 to be flared off 410, while the now separated water can proceed to a cooler 408.

From the cooler 408, the produced water enters a secondary separator 412 that includes a flow over assembly. Additional flammable gases can escape the separator 412 to be flared off 410. Other or a portion of the gases, such as methane $CH_4$ can be led to a gas compressor 414, then to a cooler 416 for creating a green completion system. After which, the methane can be stored or flared off 418.

Condensate can exit the separator 412 for further process, where methane gas MG can be captured or released. A portion of wastewater 422 exiting the separator 412 can be led into an open pond 424 wherein methane gas MG can be release and/or hydrocarbon residue HR can settle or return to the ground.

A second portion of the wastewater 422 can be led to a flocculation system 426, then to a sedimentation system 428, and then to a macro or macro-micro filtration system 430. The flocculation system 426 is configured to process the wastewater by which fine particulates are caused to clump together into a floc. The floc may then float to the top of the liquid (creaming), settle to the bottom of the liquid (sedimentation), or be readily filtered from the liquid. The macro-micro filtration system 430 can be a type of physical filtration process where a contaminated fluid is passed through a special pore-sized membrane to separate microorganisms and suspended particles from process liquid. After which, the processed wastewater can be led to refuse 434 and/or to a landfill 432 where additional methane gas MG is released.

Figure 36:
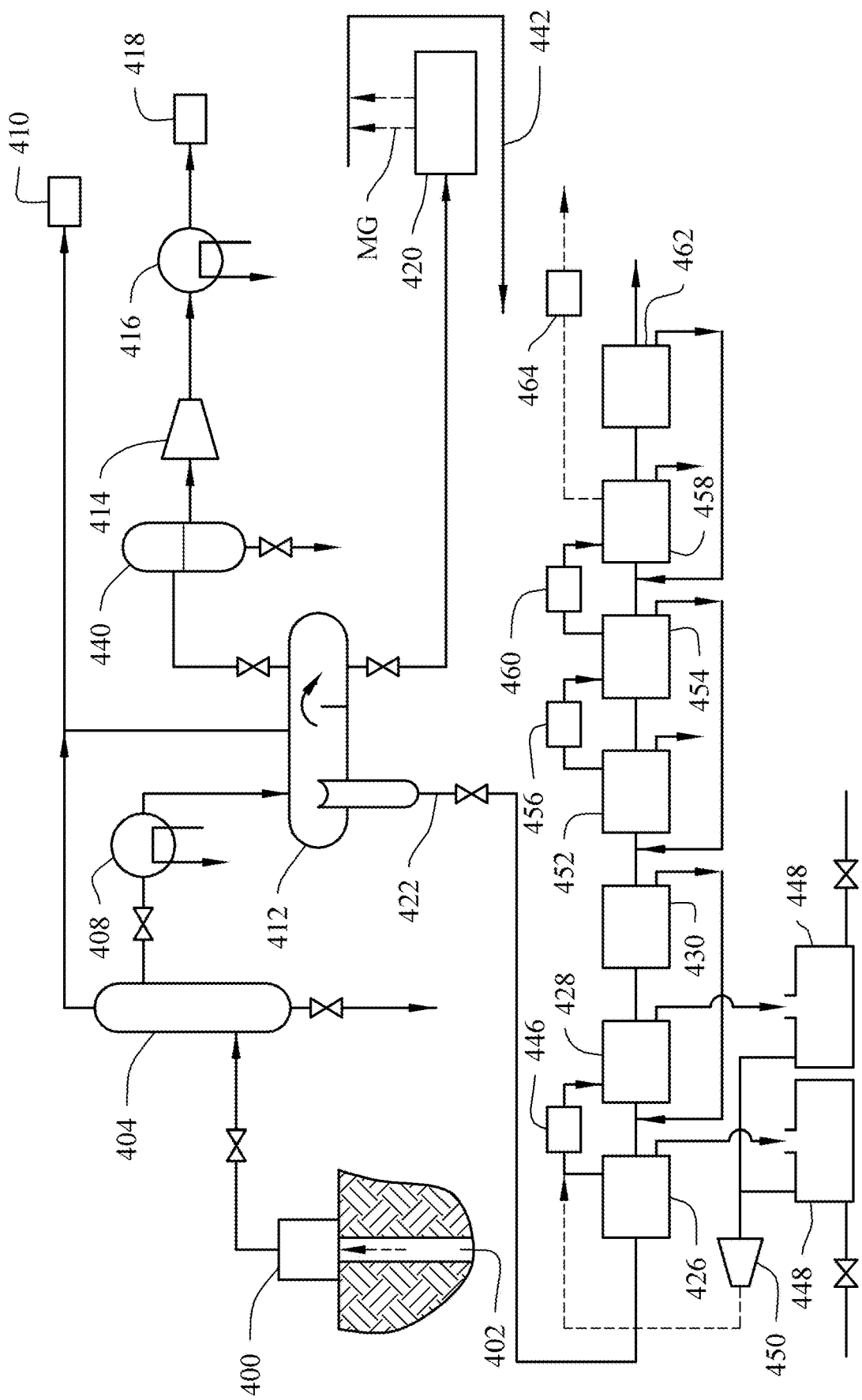
FIG. 36 is a schematic view of an embodiment of the present technology for ecologically sustainable hydraulic fracturing of natural gas.

Referring to FIG. 36, embodiments of the present technology can utilize a process and apparatus for ecologically sustainable hydraulic fracturing of natural gas for maximizing operational safety and recovery potential.

In this embodiment, the receiving of produced water is similar to that of FIG. 34, however with some modifications and additions of the present technology. The methane gas CH4 exiting the separator 412 for the green completion system first enters a coalescer 440 prior to entering the gas compressor 414.

Furthermore, the methane gas MG from the condensate 420 can be captured and led to a methane gas combustion system 442.

Still further, the wastewater 422 may be water up to 3% salinity as it enters the flocculation system 426. A methane gas CH4 combustion system 446 can be utilized with the flocculation system 426 to produce carbon dioxide CO2 that is led into the sedimentation system 428. Solid waste can exit the flocculation system 426 and sedimentation system 428 and collected in truck mounted solids waste recycle vessels 448. This solid waste can be washed and vacuumed for reuse in paving roads. Gases from the waste recycle vessels 448 can be led to a blower 450, which can feed the methane gas combustion system 446.

A portion of the wastewater from the macro-micro filtration system 430 can be led back to the sedimentation system 428 for further processing if needed. The wastewater exits the macro-micro filtration system 430 and enters an electro coagulation system 452, which is configured as a broad-spectrum treatment technology that removes total suspended solids (TSS), heavy metals, emulsified oils, bacteria and other contaminants from water. Waste, solids or sediment can be removed from the ultra-nano filtration system 454.

The wastewater exits the electro coagulation system 452 and enters an ultra-nano filtration system 454, which can have a pore size around 0.01 micron-0.001 micron. Ultrafiltration can remove larger particles, and may remove some viruses, with the nano-filtration removing most organic molecules, nearly all viruses, most of the natural organic matter and a range of salts. Nano-filtration can remove divalent ions, which make water hard.

A portion of the wastewater from the ultra-nano filtration system 454 can be led back to the electro coagulation system 452 for further processing if needed. A further portion of the wastewater can be led from the electro coagulation system 452, through a pH control system 456, and to the ultra-nano filtration system 454.

The wastewater exits the ultra-nano filtration system 454 and enters a minerals recovery system 458 that is configured to extract minerals from the wastewater and recovered for further processing or use. A portion of the wastewater can be led from the ultra-nano filtration system 454, through a temperature control system 460, and to the minerals recovery system 458. The temperature control system 460 is configured to control the temperature of the wastewater at this location of the process by either heating or cooling the portion of the wastewater and returning back to the main wastewater flow. It can be appreciated that the temperature control system 460 can be located anywhere along the wastewater flow path.

A portion of the wastewater from the minerals recovery system 458 can be led to a desalter 464, while the main wastewater flow enters a reverse osmosis system 462 the produces desalinated water. The reverse osmosis system 462 can operate at less than 100 ppm to produce desalinated potable water. A portion of the wastewater from the reverse osmosis system 462 can be led back to the minerals recovery system 458 for further processing if needed.

It can be appreciated that this embodiment takes hydraulic fracking produced water and recovers methane gas for combustion 442, recovers additional methane gas for further combustion 446 to produce carbon dioxide, recovers solids for reuse in paving roads, recovers salt by the desalter 464 to produce industrial salt, and produces desalinated water utilizing the RO system 462. This process substantially reduces the emission of methane gas into the environment.

Figure 37:
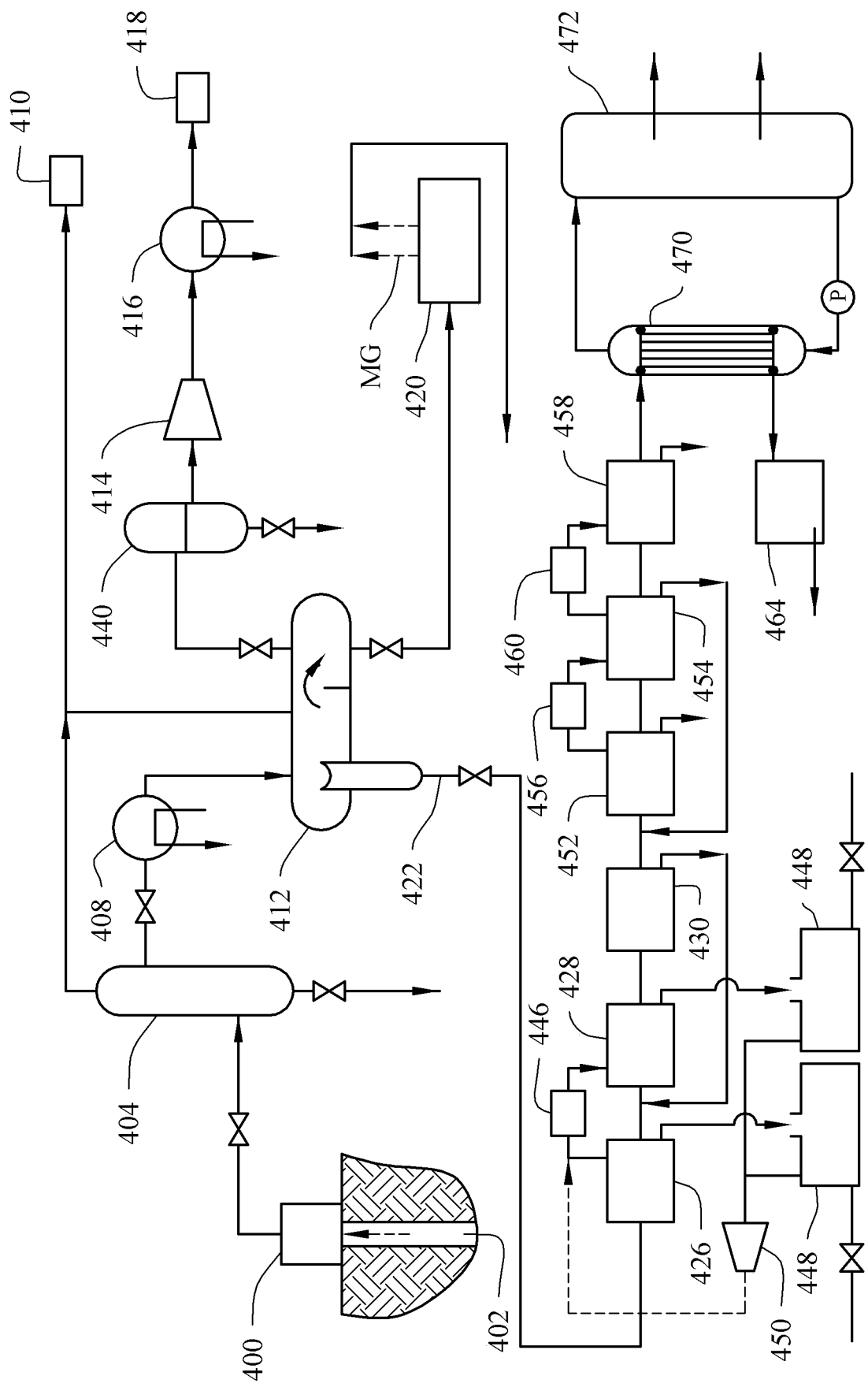
FIG. 37 is a schematic view of an embodiment of the present technology for ecologically sustainable hydraulic fracturing of natural gas with enhanced brine system recovery.

Referring to FIG. 37, embodiments of the present technology can utilize a process and apparatus for ecologically sustainable hydraulic fracturing of natural gas for maximizing operational safety and recovery potential.

In this embodiment, the receiving and processing of produced water is similar to that of FIGS. 34 and 35, however with some modifications and additions of the present technology. The wastewater 422 from the separator 412 may be water up to 7% salinity as it enters the flocculation system 426.

A difference from this embodiment to that of FIG. 36 is the omitting of the reverse osmosis system downstream of the minerals recovery system 458. In this embodiment, saline water at about 7% salinity exits the minerals recovery system 458 at around 2 m$^3$, and enters an induced symbiotic osmosis (ISO) system 470 of the present technology and as described above that can produce desalinated potable water. Brine exits the ISO system 470 and enters the desalter 464 at around 14% salinity and at about 1 m$^3$. The desalter 464 is configured to recover salt for the production of industrial salt.

A low pressure pump P circulates the saline water at about 10.5% salinity from the ISO system 470 at around 2 m$^3$ to a brine evaporation pond 472. The saline water evaporates into the atmosphere resulting in the salinity of the saline water to increase to about 21%. The saline water leaves the pond 472 and returns to the ISO system 470 via the pump P.

It can be appreciated that this embodiment takes hydraulic fracking produced water and recovers methane gas for combustion 442, recovers additional methane gas for further combustion 446 to produce carbon dioxide, recovers solids for reuse in paving roads, recovers salt by the desalter 464 to produce industrial salt, produces desalinated water utilizing the ISO system 470, and evaporates saline water in an environmentally friendly process. This process substantially reduces the emission of methane gas into the environment.

Figure 38:
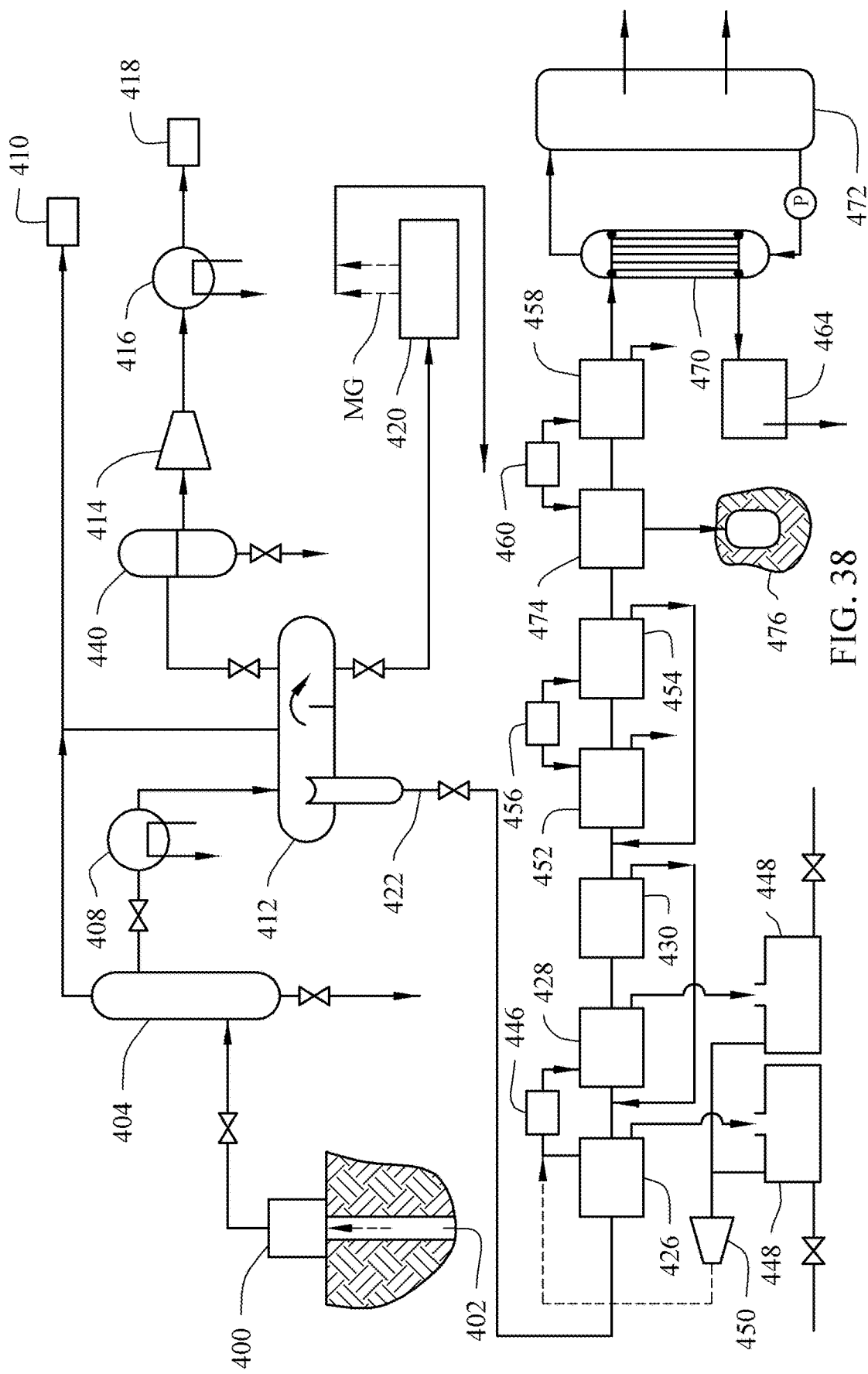
FIG. 38 is a schematic view of an embodiment of the present technology for ecologically sustainable hydraulic fracturing of natural gas with radium separation flowback of 10% salinity.

Referring to FIG. 38, embodiments of the present technology can utilize a process and apparatus for ecologically sustainable hydraulic fracturing of natural gas for maximizing operational safety and radium separation flowback of 10% salinity.

In this embodiment, the receiving and processing of produced water is similar to that of FIG. 37, however with some modifications and additions of the present technology. A difference from this embodiment to that of FIG. 37 is addition of a nano-filter 474 between the ultra-filtration system 454 and the minerals recovery system 458.

A portion of the wastewater can be led from the nano-filter 474, through a temperature control system 460, and to the minerals recovery system 458, and vice versa. The nano-filter 474 is configured to remove radium containment from the wastewater flow and store it in storage 476, which can be buried underground.

It can be appreciated that this embodiment takes hydraulic fracking produced water and recovers methane gas for combustion 442, recovers additional methane gas for further combustion 446 to produce carbon dioxide, recovers solids for reuse in paving roads, recovers salt by the desalter 464 to produce industrial salt, evaporates saline water in an environmentally friendly process, produces desalinated water utilizing the ISO system 470, and recovers and stores radium containment. This process substantially reduces the emission of methane gas into the environment.

Figure 39:
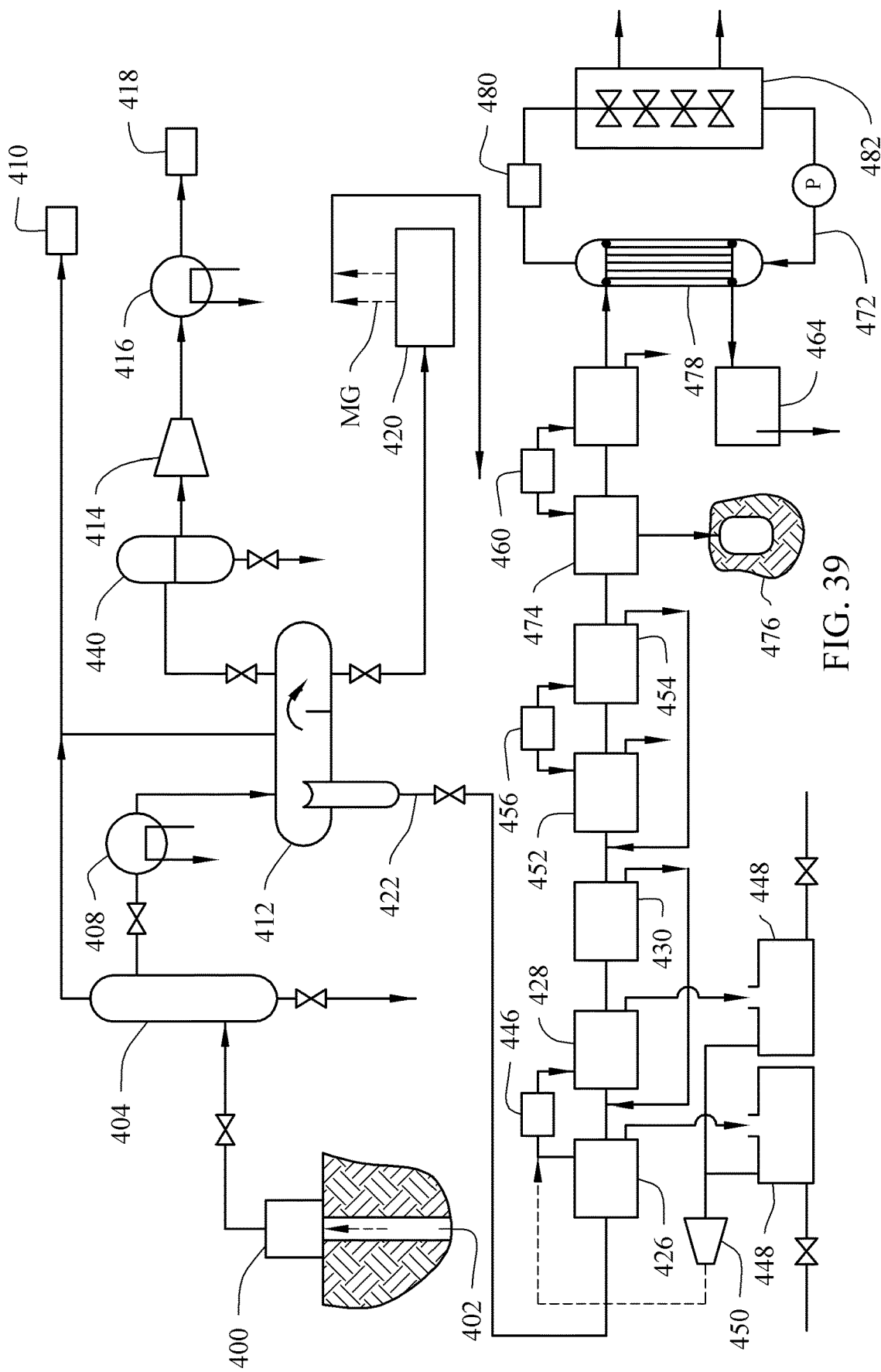
FIG. 39 is a schematic view of an embodiment of the present technology for ecologically sustainable hydraulic fracturing of natural gas with radium separation flowback of 10% salinity and salinity power generation utilizing an induced symbiotic osmosis power (ISOP) train.

Referring to FIG. 39, embodiments of the present technology can utilize a process and apparatus for ecologically sustainable hydraulic fracturing of natural gas for maximizing operational safety, radium separation flowback of 10% salinity, and enclosed salinity power generation utilizing an induced symbiotic osmosis power (IV-ISOP) train.

In this embodiment, the receiving and processing of produced water is similar to that of FIG. 38, however with some modifications and additions of the present technology. A difference from this embodiment to that of FIG. 38 is a changing of the ISO system to an ISOP train system.

In this embodiment, saline water at about 7-10% salinity exits the minerals recovery system 458 at around 2 m$^3$, and enters an ISOP system 478 of the present technology as described above. Brine exits the ISOP system 478 and enters the desalter 464 at around 14-20% salinity and at about 1 m$^3$. The desalter 464 is configured to recover salt for the production of industrial salt.

Utilizing a low pressure pump P, the saline water at about 10-12% salinity is led from the ISOP system 478 at around 2 m$^3$ to a filter 480. After which, the filtered saline water enters an ISOP train system 482 of the present technology as described above. Desalinated water can be produced from the ISOP train system 482. The saline water leaves the ISOP train system 482 at about 20-24% salinity and at around 1 m³ via the pump P, and is returned to the ISOP system 480 thereby creating a loop.

It can be appreciated that this embodiment takes hydraulic fracking produced water and recovers methane gas for combustion 442, recovers additional methane gas for further combustion 446 to produce carbon dioxide, recovers solids for reuse in paving roads, recovers salt by the desalter 464 to produce industrial salt, and produces desalinated water utilizing the ISOP train system 482. This process substantially reduces the emission of methane gas into the environment.

The solids recovered from the flocculation system 426 and sedimentation system 428 that are collected in the truck mounted solids waste recycle vessels 448 can be used with asphaltic products for paving roads, or with cement for building fences, concrete irrigation pipes, etc.

Each process system of any of the embodiments of the present technology can be single unit or a train of multiple units.

Some features of the present technology can be, but not limited to:
1. Massive multi-unit operation comprising several innovations.
2. Ecologically sustainable hydraulic fracturing process.
3. Recovers potable water from flowback and produced water of fracturing operations.
4. Desalinates flowback and produced water with salinity up to 15%.
5. Rejected brine salinity from desalination is at 30% or higher, with 50% water recovery.
6. Rejected brine can be used for salt recovery or osmotic power generation.
7. Relies on our technology of "Induced Symbiotic Osmosis (ISO) for Power Generation".
8. Relies on our technology for large scale Flat Sheet Membranes (FSM).
9. Relies on our technology of Tower Design Desalination Technology.
10. Relies on our technology for recovering potable water from brine (SRO).
11. Recovers conventional salts, sodium chloride and others.
12. Recovers minerals, based on molecular radii, particularly radium 226.
13. Mining earth soluble minerals by in situ leaching.

Osmosis relies on the chemical potential of solution, generating the tendency to transfer water in a solution from low salinity or no salinity (pure water) across a semipermeable membrane to a high salinity solution (solution of high salt content), as driven only by the chemical potential difference across said membrane.

In another explanation, osmosis is the diffusion of water molecule (0.265 nm in diameter) through a semipermeable membrane from; a solution with low or no solute concentration, signified as high chemical potential; $m_1$, having the tendency to donate water molecules to a solution with a higher solute concentration, signified a low chemical potential; $m_2$ having the tendency to accept water molecules.

The process continues until the water head rise in the high salute concentration equalizes the chemical potential difference between fluids across the membrane, implying that the chemical potentials across the membrane are equalized; $m_1 = m_2$, Osmotic pressure of sodium chloride solution is 112 PSI (7.724 bar) for every 1% salt solution (10,000 mg/l), Seawater has salt concentration of about 3.5% or osmotic pressure of about 392 psi (about 27 bars). Maximum solubility of NaCl in water at 25° C. is 35.7 g/100 g of water), or 357 g/liter of water. This implies that at 25° C., water salinity is 357 g/(357 g+1,000 g of water)=0.263, or 26.3%. Effect of temperature rise on salt solubility is rather modest. At 100° C., solubility is just 384 g/liter.

In case of seawater reverse osmosis (SWRO) desalination to achieve 50% recovery of desalinated water (causing change in salinity from 3.5%-7%), the minimum required osmotic pressure is 784 psi and actual pumping pressure could exceed 1000 psi to overcome equipment inefficiency While embodiments of the ecologically sustainable hydraulic fracturing have been described in detail, it should be apparent that modifications and variations thereto are possible, all of which fall within the true spirit and scope of the present technology. With respect to the above description then, it is to be realized that the optimum dimensional relationships for the parts of the present technology, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present technology. For example, any suitable sturdy material may be used instead of the above-described. And although processing and/or desalinating produced water from a subterranean hydraulic fracking operation have been described, it should be appreciated that the ecologically sustainable hydraulic fracturing herein described is also suitable for treating other fluids containing high salinity and/or radium containments.

Therefore, the foregoing is considered as illustrative only of the principles of the present technology. Further, since numerous modifications and changes will readily occur to those skilled in the art, it is not desired to limit the present technology to the exact construction and operation shown and described, and accordingly, all suitable modifications and equivalents may be resorted to, falling within the scope of the present technology.

What is claimed as being new and desired to be protected by Letters Patent of the United States is as follows:

1. A water treatment system for treating produced fluids from a hydraulic fracturing process or system, the system comprising:
   an induced symbiotic osmosis system comprising:
   multiple reverse osmosis membrane assemblies sequentially arranged and configured to receive produced water from a hydraulic fracturing process, the membrane assemblies each including at least one hollow fiber or flat sheet membrane and at least one header configured to receive desalinated water from the hollow fiber or flat sheet membrane;
   a frame having an open end configured to receive the membrane assemblies;
   a shell configured to receive and enclose the frame and the membrane assemblies so that an annulus is created between the shell and the frame allowing the produced water to flow into the open end of the frame and through the hollow fiber or flat sheet membrane, the shell including a waste collecting section configured to receive an effluent from the hollow fiber or flat sheet membrane; and
   a heat exchanger positioned between the reverse osmosis membrane assemblies and configured to allow the produced water to flow between the reverse osmosis membrane assemblies, the heat exchanger including a plurality of tubes extending into the flow of the produced water, the tubes being configured to receive a cooling fluid;

wherein the membrane assemblies each includes multiple interconnected hollow fiber or flat sheet membranes to create stages in the shell, with the header of a first stage being in communication with the header of a second;

wherein the shell is a tower with the stages being stacked in a vertical relationship.

2. The system according to claim 1, wherein the shell is associated with one or more additional shells to form a train of sequentially connected shells.

3. The system according to claim 2, wherein the desalinated water of a first of the sequentially connected shells in the train is transferred in sequence to each succeeding of the shells until exiting a last of the shells in the train, with the effluent of the last of the shells is transferred in sequence to each preceding of the shells until exiting the first of the shells.

4. The system according to claim 3 further comprises a pump associated with transferring of the desalinated water, and a pressure exchanger associated with transferring of the effluent, the pressure exchanger is in operable association with the pump.

5. The system according to claim 1 further comprising:
a flocculation system and a sedimentation system configured to receive the produced water prior to entering the induced symbiotic osmosis system; and
a combustion system configured to receive gas or liquid associated with waste from the flocculation system or the sedimentation system to convert methane gas from the flocculation system to carbon dioxide that is provided to the sedimentation system.

6. The system according to claim 1 further comprising an electro coagulation system configured to receive the produced water prior to entering the induced symbiotic osmosis system.

7. The system according to claim 6 further comprising an ultra or nano filtration system configured to receive the produced water from the electro coagulation system and prior to entering the induced symbiotic osmosis system.

8. The system according to claim 7 further comprising a pH system configured to receive a portion of the produced water from the electro coagulation system, adjust the pH of the portion of the produced water, and return the portion of the produced water back to the ultra or nano filtration system.

9. The system according to claim 7 further comprising a minerals recovery system configured to receive the produced water from the ultra or nano filtration system prior to entering the induced symbiotic osmosis system, the minerals recovery system is configured to extract minerals from the produced water.

10. The system according to claim 9 further comprising a temperature control system configured to receive a portion of the produced water prior to entering the induced symbiotic osmosis system, heat or cool the produced water, and return the portion of the produced water back to the minerals recovery system.

11. The system according to claim 10 further comprising a desalter configured to receive brine produced from the induced symbiotic osmosis system.

12. The system according to claim 11 further comprising a nano filter configured to receive produced water from the ultra or nano filtration system prior to entering the minerals recovery system, the nano filter is configured to filter out radium containment from the produced water.

13. A water treatment system for treating produced fluids from a hydraulic fracturing process or system, the system comprising:
an electro coagulation system configured to receive produced water;
an ultra or nano filtration system configured to receive the produced water from the electro coagulation system;
an induced symbiotic osmosis system configured to receive the produced water from the ultra or nano filtration system, the induced symbiotic osmosis system comprising:
multiple reverse osmosis membrane assemblies sequentially configured to receive the produced water from a hydraulic fracturing process, the membrane assemblies each including at least one hollow fiber or flat sheet membrane and at least one header configured to receive desalinated water from the hollow fiber or flat sheet membrane;
a heat exchanger positioned between the reverse osmosis membrane assemblies and configured to allow the produced water to flow between the reverse osmosis membrane assemblies, the heat exchanger including a plurality of tubes extending into the flow of the produced water, the tubes being configured to receive a cooling fluid;
a frame having an open end configured to receive the membrane assemblies and the heat exchanger; and
a shell configured to receive and enclose the frame, the membrane assemblies and the heat exchanger so that an annulus is created between the shell and the frame allowing the produced water to flow into the open end of the frame and through the hollow fiber or flat sheet membrane, the shell including a waste collecting section configured to receive an effluent from the hollow fiber or flat sheet membrane; and
a desalter configured to receive brine produced from the induced symbiotic osmosis system.

14. The system according to claim 13, wherein each of the membrane assemblies includes multiple interconnected hollow fiber or flat sheet membranes to create stages in the shell, with the header of a first stage of the stages being in communication with the header of a second stage of the stages.

15. The system according to claim 13, wherein the induced symbiotic osmosis system is a train including multiple sequentially connected shells, with each of the shells including the membrane assemblies, and the frame.

16. The system according to claim 15 wherein the desalinated water of a first of the shells in the train is transferred in sequence to each succeeding the shell until exiting a last of the shells in the train, with the effluent of the last of the shells is transferred in sequence to each preceding the shell until exiting the first of the shells.

17. A method of using a water treatment system for treating produced fluids from a hydraulic fracturing process or system, the method comprising the steps of:
a) receiving, in multiple reverse osmosis membrane assemblies of an induced symbiotic osmosis system, produced water from a hydraulic fracturing process, the membrane assemblies being sequentially arranged, the multiple reverse osmosis membrane assemblies each including at least one header;
b) desalinating the produced water utilizing the induced symbiotic osmosis system comprising a shell enclosing at least one hollow fiber or flat sheet membrane and the at least one header configured to receive desalinated water from the hollow fiber or flat sheet membrane, and a frame having an open end configured to receive the membrane assembly, wherein an annulus is created between the shell and the frame allowing the produced water to flow into the open end of the frame and through the hollow fiber or flat sheet membrane;

c) flowing the produced water through a heat exchanger positioned between the reverse osmosis membrane assemblies, the heat exchanger including a plurality of tubes extending into the flow of the produced water, the tubes being configured to receive a cooling fluid;

d) receiving a brine effluent, in a waste collecting section of the shell, from the hollow fiber or flat sheet membrane; and e) discharging the brine effluent from the shell;

wherein the membrane assemblies each include multiple interconnected hollow fiber or flat sheet membranes to create stages in the shell, with the header of a first stage being in communication with the header of a second;

wherein the shell is a tower with the stages being stacked in a vertical relationship.

18. A water treatment system for treating produced fluids from a hydraulic fracturing process or system, the system comprising:

an induced symbiotic osmosis system comprising:
multiple reverse osmosis membrane assemblies sequentially arranged and configured to receive produced water from a hydraulic fracturing process, the membrane assemblies each including at least one hollow fiber or flat sheet membrane and at least one header configured to receive desalinated water from the hollow fiber or flat sheet membrane;

a frame having an open end configured to receive the membrane assemblies;

a shell configured to receive and enclose the frame and the membrane assemblies so that an annulus is created between the shell and the frame allowing the produced water to flow into the open end of the frame and through the hollow fiber or flat sheet membrane, the shell including a waste collecting section configured to receive an effluent from the hollow fiber or flat sheet membrane;

a flocculation system and a sedimentation system configured to receive the produced water prior to entering the induced symbiotic osmosis system; and a combustion system configured to receive gas or liquid associated with waste from the flocculation system or the sedimentation system to convert methane gas from the flocculation system to carbon dioxide that is provided to the sedimentation system.

* * * * *